(12) United States Patent
Luo

(10) Patent No.: US 8,457,178 B2
(45) Date of Patent: Jun. 4, 2013

(54) FREQUENCY OFFSET ESTIMATOR

(75) Inventor: Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1046 days.

(21) Appl. No.: 12/055,087

(22) Filed: Mar. 25, 2008

(65) Prior Publication Data

US 2008/0260006 A1  Oct. 23, 2008

Related U.S. Application Data

(60) Provisional application No. 60/908,180, filed on Mar. 26, 2007.

(51) Int. Cl.
*H04B 1/00* (2006.01)
(52) U.S. Cl.
USPC ........... 375/149; 375/130; 375/140; 375/147; 375/354; 375/343; 375/260; 375/272; 375/285; 375/367; 327/164; 370/203; 370/208; 370/209; 370/320; 370/335; 370/342; 370/441; 370/479; 455/42; 455/110; 455/205; 455/422.1; 455/507
(58) Field of Classification Search
USPC ........................................ 375/149, 260, 267
See application file for complete search history.

(56) References Cited

U.S. PATENT DOCUMENTS

| 5,659,573 | A | 8/1997 | Bruckert et al. | |
|---|---|---|---|---|
| 5,852,630 | A * | 12/1998 | Langberg et al. | 375/219 |
| 6,608,858 | B1 | 8/2003 | Sih et al. | |
| 6,724,834 | B2 * | 4/2004 | Garrett et al. | 375/317 |
| 6,731,911 | B1 | 5/2004 | Hirata et al. | |
| 7,030,811 | B2 * | 4/2006 | Goren et al. | 342/387 |
| 7,190,940 | B2 | 3/2007 | Muralidhar et al. | |
| 7,532,590 | B2 * | 5/2009 | Ok et al. | 370/310 |
| 2003/0081633 | A1 * | 5/2003 | Ben-Eli et al. | 370/503 |
| 2003/0161428 | A1 * | 8/2003 | Garrett et al. | 375/368 |
| 2003/0202565 | A1 * | 10/2003 | Li et al. | 375/147 |
| 2003/0223384 | A1 * | 12/2003 | Sengupta et al. | 370/320 |
| 2004/0013169 | A1 * | 1/2004 | Kanemoto et al. | 375/147 |
| 2004/0196930 | A1 * | 10/2004 | Molnar | 375/344 |

(Continued)

FOREIGN PATENT DOCUMENTS

| JP | 2002152088 A | 5/2002 |
|---|---|---|
| JP | 2003218739 A | 7/2003 |

(Continued)

OTHER PUBLICATIONS

International Search Report—PCT/US08/058311, International Search Authority—European Patent Office, Aug. 11, 2008.

(Continued)

*Primary Examiner* — Shuwang Liu
*Assistant Examiner* — Gina McKie
(74) *Attorney, Agent, or Firm* — Kenneth Vu

(57) ABSTRACT

Determining a frequency offset of a received signal utilizing two or more multipath components of the received signal is provided herein. By way of example, the received signal can be correlated with a synchronization sequence in a time domain or a frequency domain, resulting in separation of the two or more multipath components of the received signal. Analysis of at least one of the multipath components can provide a frequency offset of the received signal. Furthermore, by analyzing the multipath components, estimation of the frequency offset can be improved as compared with single-signal analysis techniques.

33 Claims, 14 Drawing Sheets

U.S. PATENT DOCUMENTS

| | | | |
|---|---|---|---|
| 2005/0008040 A1* | 1/2005 | Becker et al. | 370/503 |
| 2005/0013380 A1* | 1/2005 | Kim et al. | 375/259 |
| 2005/0094550 A1* | 5/2005 | Huh et al. | 370/203 |
| 2005/0201449 A1* | 9/2005 | Churan | 375/149 |
| 2005/0233710 A1* | 10/2005 | Lakkis et al. | 455/102 |
| 2005/0287956 A1* | 12/2005 | Golden et al. | 455/67.16 |
| 2006/0104257 A1* | 5/2006 | Laroia et al. | 370/350 |
| 2007/0133391 A1* | 6/2007 | Roh et al. | 370/208 |

FOREIGN PATENT DOCUMENTS

| | | |
|---|---|---|
| JP | 2003523688 A | 8/2003 |
| JP | 2007521679 A | 8/2007 |
| JP | 2007525101 A | 8/2007 |
| RU | 2195772 | 12/2002 |
| WO | WO9815070 | 4/1998 |
| WO | 0159937 | 8/2001 |
| WO | WO0161880 A1 | 8/2001 |
| WO | 0227956 | 4/2002 |
| WO | 0229978 | 4/2002 |

OTHER PUBLICATIONS

Written Opinion—PCT/US08/058311, International Search Authority—European Patent Office, Aug. 11, 2008.

Taiwan Search Report—TW097110920—TIPO—Jul. 10, 2012.

Tufvesson F., et al., "OFDM Time and Frequency Synchronization by Spread Spectrum Pilot Technique", Communication Theory Mini-Conference, pp. 116-119, year 1999.

* cited by examiner

FREQUENCY OFFSET ESTIMATOR

CROSS REFERENCE TO RELATED APPLICATIONS

The present Non-provisional application for patent claims priority to Provisional Patent Application No. 60/908,180 filed on Mar. 26, 2007 and entitled A METHOD AND APPARATUS FOR IMPROVED FREQUENCY OFFSET ESTIMATOR FOR INITIAL ACQUISITION IN E-UTRAN SYSTEMS, assigned to the assignee hereof and hereby expressly incorporated by reference herein.

BACKGROUND

I. Field

The following relates generally to wireless communication, and more specifically to determining a frequency offset for a signal received over a wireless channel.

II. Background

Wireless communication systems are widely deployed to provide various types of communication content such as, e.g., voice content, data content, and so on. Typical wireless communication systems can be multiple-access systems capable of supporting communication with multiple users by sharing available system resources (e.g., bandwidth, transmit power). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where each of the $N_S$ independent channels corresponds to a dimension. Moreover, MIMO systems can provide improved performance (e.g., increased spectral efficiency, higher throughput and/or greater reliability) if additional dimensionalities created by the multiple transmit and receive antennas are utilized.

Wireless signals received at a mobile device, whether sent by a multiple output or single output transmission, can typically be replicated at the device for analysis, demodulation, or other forms of signal processing or data analysis. Where a replica fails to accurately represent the transmitted signal, signal corrections can be implemented. For instance, if a received signal and device-generated replica are shifted in frequency or phase, an offset can be determined and utilized as a correction factor. The received signal or the replicated signal, or both signals in some instances, can be adjusted based on the offset/correction factor. Accordingly, analysis of the received signal can more accurately reflect data transmitted by the transmission system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects of the claimed subject matter and corresponding disclosure thereof, a frequency offset of a received signal is determined utilizing two or more multipath components of the received signal. In some aspects, the received signal is correlated with a synchronized signal in a time domain, resulting in separation of the two or more multipath components of the received signal. Analysis of at least one of the multipath components can provide a frequency offset of the received signal.

In some aspects, the multipath component(s) is separated into two or more time based portions. A differential product is applied to the time based portions of the multipath component (s), and the frequency offset can be obtained there from. According to further aspects, applying the differential product to multiple multipath components can improve the offset frequency.

According to still other aspects, a received signal is rotated by an initial frequency offset estimation and then correlated with the synchronized signal in a frequency domain. A resulting signal can then be converted back to a time domain to distinguish multipath components of the resulting signal. Analysis of one or more of such distinguished multipath components, can then provide the frequency offset of the received signal. Thus, as described herein, the frequency offset can be applied to a received signal to improve wireless communication with a receiving mobile device.

According to further aspects, disclosed is a method of wireless communication. The method can comprise correlating a received signal with a synchronization sequence, wherein a resulting correlated signal comprises two or more separate multipath components. Further, the method can comprise analyzing at least one of the two or more separate multipath components and obtaining a frequency offset of the received signal from the analysis.

In addition to the foregoing, according to some aspects provided is an apparatus that provides wireless communication. The apparatus can comprise a processing module that correlates a received signal with a synchronization sequence, wherein a resulting correlated signal comprises two or more separate multipath components. The apparatus can further comprise a multipath analysis module that evaluates at least one of the two or more separate multipath components and obtains a frequency offset of the received signal.

According to other aspects, provided is an apparatus that provides wireless communication. The apparatus can comprise means for correlating a received signal with a synchronization sequence, wherein a resulting correlated signal comprises two or more separate multipath components. Additionally, the apparatus can comprise means for analyzing at least one of the two or more separate multipath components and for obtaining a frequency offset of the received signal from the analysis.

In accordance with still other aspects, disclosed is a processor that provides wireless communication. The processor can comprise a first module configured to correlate a received signal with a synchronization sequence, wherein a resulting correlated signal comprises two or more separate multipath components. The processor can further comprise a second module configured to analyze at least one of the two or more separate multipath components and obtain a frequency offset of the received signal from the analysis.

According to at least one aspect, provided is a computer-readable medium comprising instructions configured to provide wireless communication. The instructions can be executable to cause at least one computer to correlate a received signal with a synchronization sequence, wherein a resulting correlated signal comprises two or more separate multipath components. The instructions can be further executable to cause at least one computer to analyze at least one of the two or more separate multipath components and obtain a frequency offset of the received signal from the analysis.

Additionally, according to further aspects disclosed is a method of remote communication. The method can comprise transmitting a wireless signal and a synchronization sequence and receiving a replica of the wireless signal, wherein the replica comprises at least two multipath components. The method can further comprise correlating the replica of the wireless signal with the synchronization sequence, wherein a resulting correlated signal comprises at least two distinct multipath components. Additionally, the method can comprise determining a frequency offset between the wireless signal and the replica of the wireless signal from one or more of the at least two distinct multipath components.

According to one or more other aspects, provided is an apparatus that facilitates remote communication. The apparatus can comprise a transmitter that sends a wireless signal and a synchronization sequence and a receiver that obtains a replica of the wireless signal, wherein the replica comprises at least two multipath components. Further, the apparatus can comprise a signal processor that correlates the replica of the wireless signal with the synchronization sequence, wherein a resulting correlated signal comprises at least two distinct multipath components that are received at the mobile device. Moreover, the apparatus can comprise an analysis module that determines a frequency offset between the wireless signal and the replica of the wireless signal from one or more of the at least two distinct multipath components.

According to further aspects, disclosed is an apparatus that facilitates wireless communication. The apparatus can comprise means for transmitting a wireless signal and a synchronization sequence and means for receiving a replica of the wireless signal, wherein the replica comprises at least two multipath components. In addition, the apparatus can comprise means for correlating the replica of the wireless signal with the synchronization sequence, wherein a resulting correlated signal comprises at least two distinct multipath components. Moreover, the apparatus can comprise means for determining a frequency offset between the wireless signal and the replica of the wireless signal from one or more of the at least two distinct multipath components.

According to one or more additional aspects, provided is a processor that provides wireless communication. The processor can comprise a first module configured to transmit a wireless signal and a synchronization sequence and a second module configured to receive a replica of the wireless signal, wherein the replica comprises at least two multipath components. The processor can additionally comprise a third module configured to correlate the replica of the wireless signal with the synchronization sequence, wherein a resulting correlated signal comprises at least two distinct multipath components. Moreover, the processor can comprise a fourth module configured to determine a frequency offset between the wireless signal and the replica of the wireless signal from one or more of the at least two distinct multipath components.

According to at least one further aspect, disclosed is a computer-readable medium comprising computer-readable instructions configured to provide wireless communication. The instructions can be configured to cause at least one computer to transmit a wireless signal and a synchronization sequence and to receive a replica of the wireless signal e, the replica comprises at least two multipath components. The instructions can be further configured to cause at least one computer to correlate the replica of the wireless signal with the synchronization sequence, wherein a resulting correlated signal comprises at least two distinct multipath components. Moreover, the instructions can be further configured to cause at least one computer to determine a frequency offset between the wireless signal and the replica of the wireless signal from one or more of the at least two distinct multipath components.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
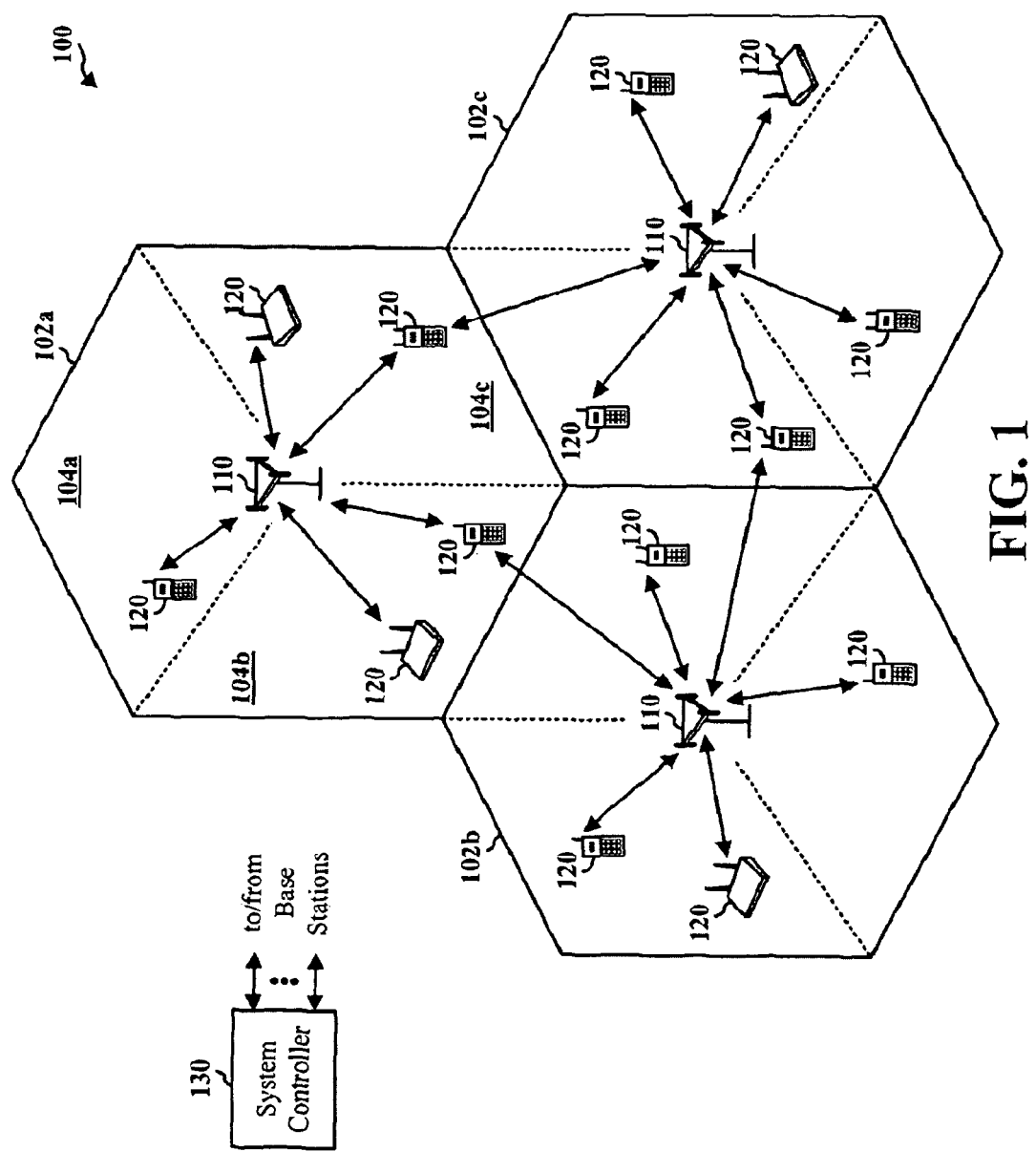
FIG. 1 illustrates a block diagram of a sample communication environment that provides wireless communication.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are descried in the context of determining characteristics of one or more wireless channels and providing a handover determination based in part on magnitudes of the determined characteristics. One skilled in the art should appreciate that similar techniques could apply to other communication environments.

As described herein, the subject disclosure provides for determining a frequency offset for received wireless communication. The frequency offset can pertain to a static or variable difference in frequency of a received signal versus frequency of a generated signal. More particularly, the generated signal can comprise a replica of the received signal generated at a receiving device.

Mobile devices can often replicate received wireless communications to process, analyze, or demodulate, etc., the wireless communications. However, depending on quality of hardware and/or software components utilized to generate the replica (e.g., a signal oscillator), the generated signal can often contain significant differences from the received signal. As one example, a significant difference in carrier wave frequency can result if a relatively low quality signal oscillator is utilized to replicate the carrier wave at a receiving mobile device. If differences in characteristics of a received signal and a generated signal are not properly corrected, data processing errors can result.

The subject disclosure provides for utilizing separate multipath components of a received signal to determine a frequency offset of the received signal. The frequency offset can be, for instance, in comparison to a replica of a carrier wave associated with the received signal. In modern wireless communications, received wireless signals often include two or more replications of a transmitted signal, called multipath signals, or multipath components. Multipath is a propagation phenomenon affecting electromagnetic waves and signals (e.g., radio frequency [RF] waves, microwave frequency [MF] waves, optical frequency waves, X-Rays, and so on). In some instances, multipath signals can be reflected, refracted and/or scattered components of a transmitted signal that arrive at a receiver. The multipath signals can be generated by atmospheric conditions (e.g., atmospheric ducting, ionospheric reflection/refraction/scattering), reflections or scattering off of terrestrial objects (e.g., mountains, buildings), or the like. Because the multipath signals propagate at substantially the same speed, yet arrive at a receiver along paths of varying length, the signals can arrive at the receiver at distinct points in time.

Multipath signals are generally replications of a transmitted signal, and thus information about the transmitted signal can be obtained from any suitable multipath signal. As described herein, multipath components of a received signal can be utilized to determine information about the received signal. Such information can be utilized to identify an offset frequency of the received signal with respect to a device-generated replica. In addition, by analyzing multiple, multipath components, errors in offset frequency can be mitigated as compared with single path analysis. Accordingly, the subject disclosure provides an improved mechanism to determine a frequency offset of a received signal as compared with a single path analysis.

As used in the subject disclosure, the terms "component," "system," and the like are intended to refer to a computer-related entity, either hardware, software, software in execution, firmware, middle ware, microcode, and/or any combination thereof. For example, a component can be, but is not limited to being, a process running on a processor, a processor, an object, an executable, a thread of execution, a program, and/or a computer. One or more components can reside within a process and/or thread of execution and a component can be localized on one computer and/or distributed between two or more computers. Also, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein can be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a subscriber station. A subscriber station can also be called a system, a subscriber unit, mobile station, mobile, remote station, remote terminal, access terminal, user terminal, user agent, a user device, or user equipment. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the figures, FIG. 1 illustrates a block diagram of a sample communication environment that provides wireless communication. Wireless communication system 100 can comprise multiple base stations 110 and multiple terminals 120, and can be utilized in conjunction with one or more aspects of the subject disclosure. A base station can generally be a fixed station that communicates with the terminals and can also be called an access point, a Node B, or some other terminology. Each base station 110 provides communication coverage for a particular geographic area, illustrated as three geographic areas, labeled 102a, 102b, and 102c. The term "cell" can refer to a base station and/or its coverage area depending on the context in which the term is used. To improve system capacity, a base station coverage area can be partitioned into multiple smaller areas (e.g., three smaller areas, according to cell 102a in FIG. 1), 104a, 104b, and 104c. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the following description, the term "base station" is used generically for a fixed station that serves a sector as well as a fixed station that serves a cell.

Terminals 120 can typically be dispersed throughout the system, and each terminal can be fixed or mobile. A terminal can also be called a mobile station, user equipment, a user device, or some other terminology. A terminal can be a wireless device, a cellular phone, a personal digital assistant (PDA), a wireless modem card, and so on. Each terminal 120 can communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for base stations 110. For a distributed architecture, base stations 110 can communicate with one another as needed. Data transmission on the forward link occurs from one access point to one access terminal at or near the maximum data rate that can be supported by the forward link and/or the communication system. Additional channels of the forward link (e.g., control channel) can be transmitted from multiple access points to one access terminal. Reverse link data communication can occur from one access terminal to one or more access points.

Figure 2:
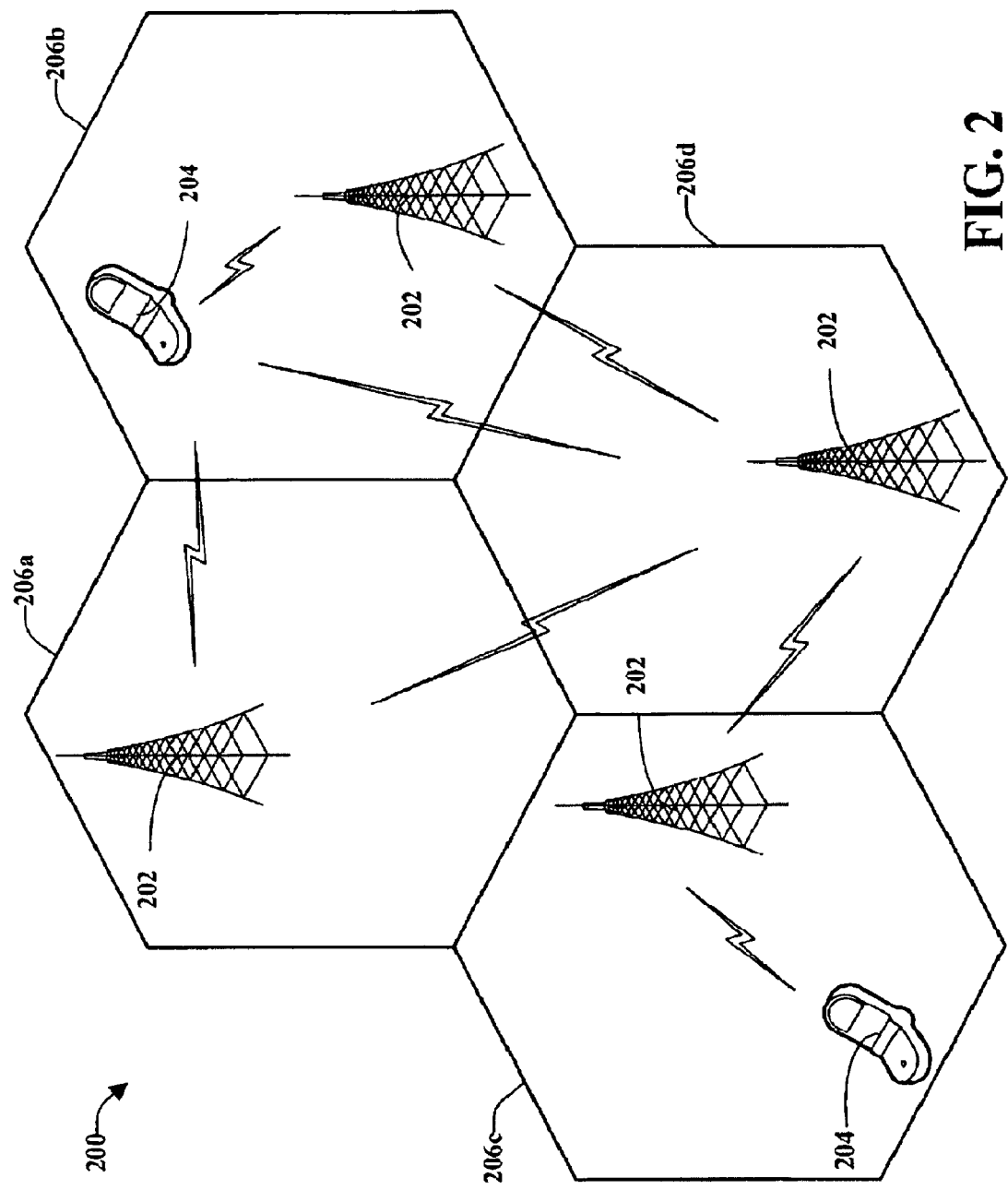
FIG. 2 depicts a block diagram of an example communications apparatus for employment with a wireless communication environment.

FIG. 2 is an illustration of an ad hoc or unplanned/semi-planned wireless communication environment 200, in accordance with various aspects. System 200 can comprise one or more base stations 202 in one or more sectors that receive, transmit, repeat, etc., wireless communication signals to each other and/or to one or more mobile devices 204. As illustrated, each base station 202 can provide communication coverage for a particular geographic area, illustrated as four geographic areas, labeled 206a, 206b, 206c and 206d. Each base station 202 can comprise a transmitter chain and a receiver chain, each of which can in turn comprise a plurality of components associated with signal transmission and reception (e.g., processors, modulators, multiplexers, demodulators, demultiplexers, antennas, and so forth.), as will be appreciated by one skilled in the art. Mobile devices 204 can be, for example, cellular phones, smart phones, laptops, handheld communication devices, handheld computing devices, satellite radios, global positioning systems, PDAs, and/or any other suitable device for communicating over wireless network 200. System 200 can be employed in conjunction with various aspects described herein in order to facilitate determining wireless channel characteristics and/or determining mobile handover based on differences in such determined characteristics, as set forth with regard to subsequent figures.

Figure 3:
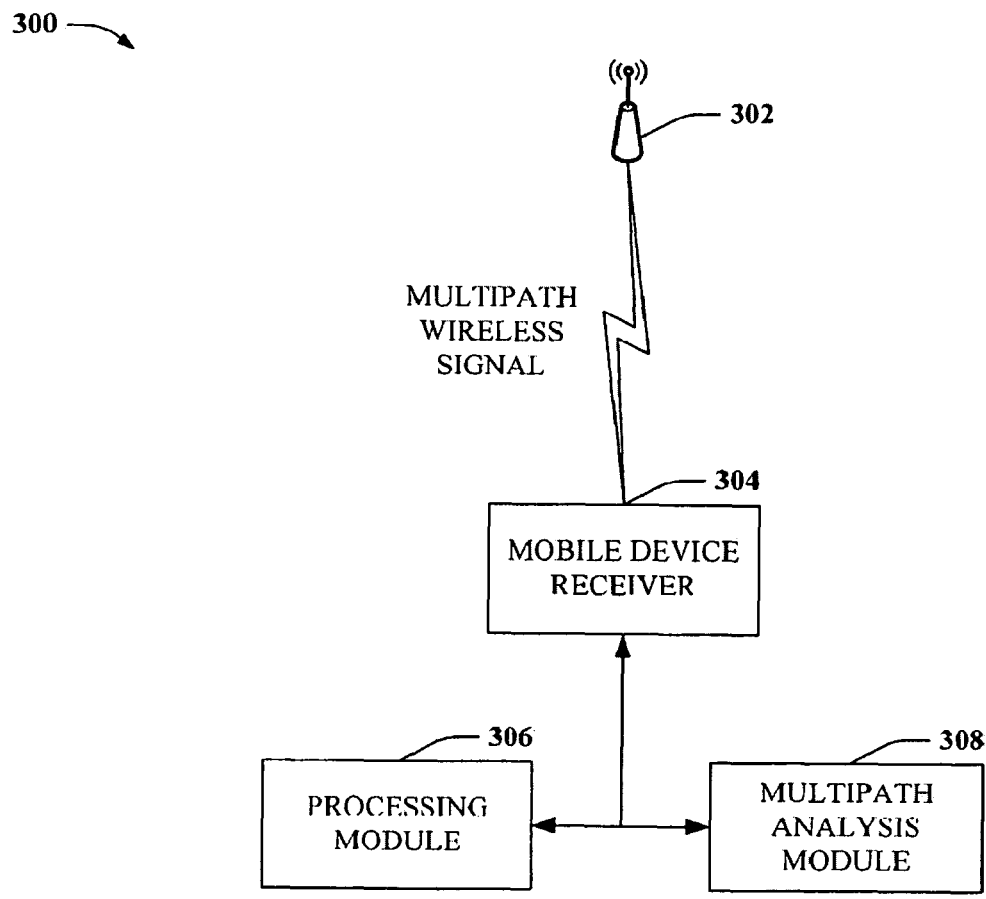
FIG. 3 illustrates a block diagram of a sample system that facilitates determination of a frequency offset of a received wireless signal.

FIG. 3 illustrates a block diagram of a sample system 300 that facilitates determination of a frequency offset of a received wireless signal. System 300 can include a wireless transmitter 302 that transmits one or more wireless signals (e.g., RF signals, WF signals, and so on). A mobile device receiver 304 can obtain the wireless signals transmitted by the transmitter 302 (e.g., by way of an antenna, not depicted). The wireless signals received at the mobile device receiver 304 can comprise two or more multipath components. Such components can result from reflection, refraction and/or scattering of the wireless signals transmitted by transmitter 302.

In some aspects of the subject disclosure, mobile device receiver 304 can generate a replica of a carrier frequency associated with received signals. The carrier frequency replica can be utilized by the receiver (304) and other components of system 100 (e.g., 306, 308). For instance, the replicated carrier frequency can be utilized to process and/or analyze information associated with the received signal.

System 100 can further include a processing module 306. Processing module can obtain the received wireless signals, including the two or more multipath components, from the mobile device receiver 304. In addition, processing module can correlate the received signal with a synchronization sequence. An output of the processing module 306 can comprise a signal having two or more separate multipath components.

A synchronization sequence utilized by processing module 306 can comprise a primary synchronization channel (PSC), a secondary synchronization channel (SSC), or a combination thereof or of the like. The synchronization sequence, or data identifying the synchronization sequence, can be transmitted by transmitter 302 and included within the received signal obtained by the mobile device receiver 304. A sequence identified within the received signal can be extracted there from and/or forwarded to the processing module 306 along with the received signal or a portion thereof. In some aspects, by correlating the received signals with the synchronization sequence the two or more multipath components can be separated out of the received signals. In at least one aspect, the two or more multipath components can be separated out of the received signals, by correlating the received signal with multipath-dependent components of the synchronization sequence.

According to at least one specific aspect, processing module 306 can split the received signal and synchronization sequence into multiple corresponding time segments for each multipath component. In addition, corresponding segments of the received signal and the synchronization sequence, or a modified form of the synchronization sequence, can be correlated. In at least one example, the corresponding time segments can be correlated with a despreading function. Once each signal time segment is correlated with a corresponding sequence time segment, the time-based results can be summed into one or more time-based correlation segments. According to at least one additional aspect, processing module 306 can correlate the received signal with one or more synchronization sequences at least in part in a frequency domain, rather than (or in addition to) a time domain.

System 300 can also include a multipath analysis component 308. Multipath analysis component 308 can analyze at least one of the two or more separate multipath components provided by the processing module 306, and obtain a frequency offset of the received signal from the analysis. In at least one aspect, the multipath analysis component 308 can employ a differential product to analyze the at least one multipath component. According to one or more additional aspects, if processing module 306 outputs multiple time based correlated segments, the analysis (e.g., differential product) can be applied to at least two corresponding time based segments. According to at least one other aspect, if processing module 306 correlates the received signals with two or more synchronization functions in a frequency domain, the analysis can be conducted with respect to corresponding multipath segments of the resulting correlated signals.

As described, system 300 can distinguish and employ multipath segments of a received wireless signal to generate an offset frequency for the wireless signal. Accordingly, accuracy of the offset frequency generated at a receiving device can be greatly improved by employing the multipath segments as described herein. Thus, costs associated with processing and/or analyzing received wireless communications can be reduced by utilizing the improved frequency offset.

Figure 4:
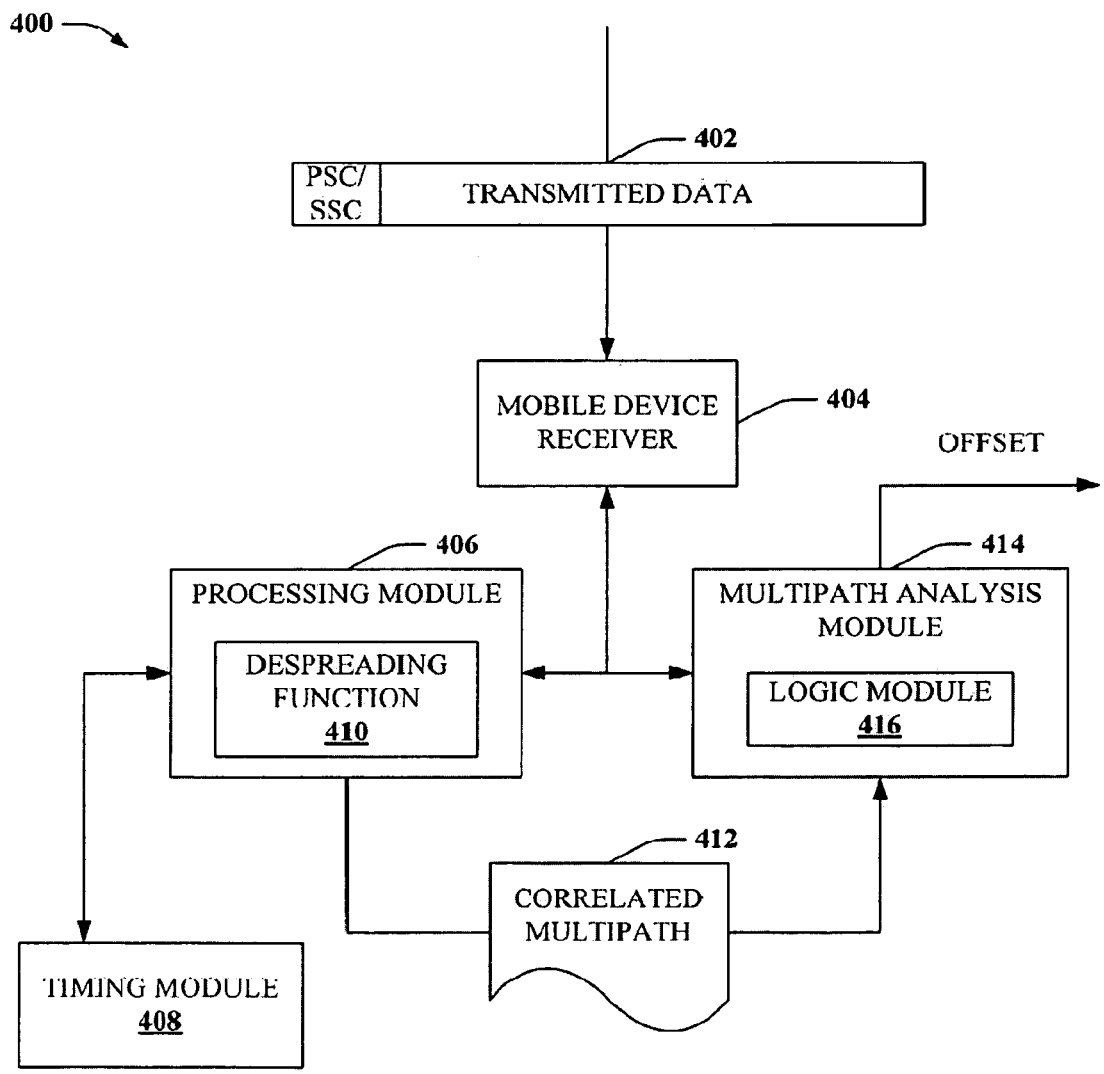
FIG. 4 depicts a block diagram of an example system that correlates and analyzes received wireless signals according to aspects of the subject disclosure.

FIG. 4 depicts a block diagram of an example system 400 that correlates and analyzes received wireless signals according to aspects of the subject disclosure. Transmitted data 402 can comprise at least a PSC or an SSC, or both. The transmitted data 402 can also comprise at least one carrier signal. The transmitted data is received at mobile device receiver 404. Furthermore, as received, the transmitted data 402 can comprise at least two multipath components of an original transmitted signal (not depicted).

Mobile device receiver 402 can generate a replica of the transmitted data as received, or a portion of such data or one or more aspects of such data (e.g., a carrier frequency), or a suitable combination thereof or of the like. A frequency offset between the generated replica and the received signal can be determined by additional modules (406, 408, 412, 414) of system 400. The mobile device receiver 402 can forward the received signal as well as one or more PSC or SSC sequences to processing module 406.

Processing module 406 can correlate the received signal with one or more of the PSC and/or SSC sequences. In addition, the PSC and/or SSC sequences can be generated as a function of multipath components of the received signals (e.g., such sequences can be delayed an amount of time that corresponds to a multipath component). A signal resulting from the correlation, or a resulting correlation signal, can comprise two or more separated multipath components. Furthermore, the processing module 406 can provide received signals and/or synchronization sequences to a timing module 408. Timing module 408 can split such signals into a plurality of time segments. As a particular example, the timing module 408 can split each of the signals into 64 time based segments, wherein each time based segment of the received signal corresponds to an appropriate time based segment of a synchronization sequence(s). The time segments can be provided to processing module 406, which can correlate the signals as described herein at least as a function of time based segments.

Figure 5:
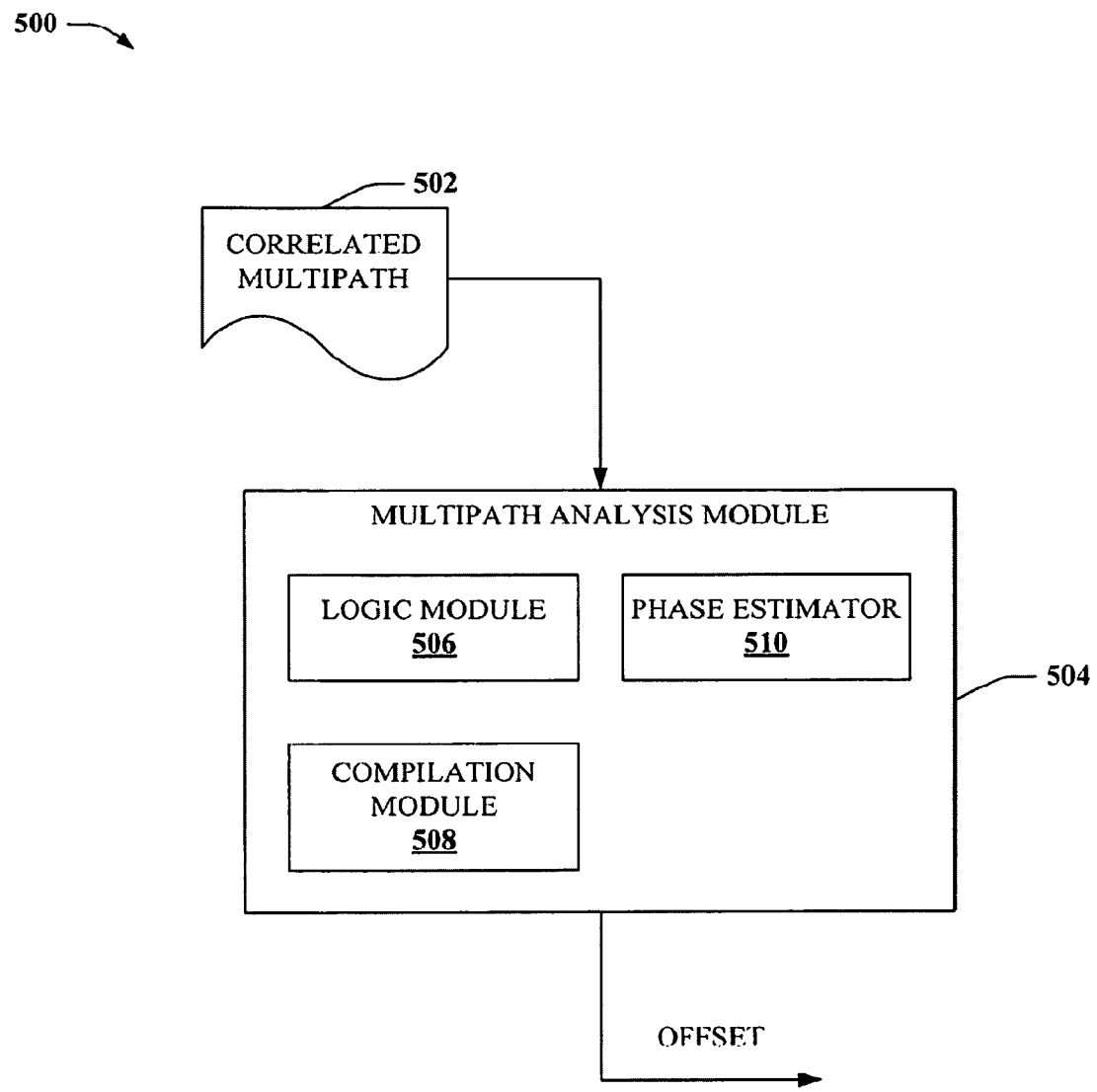
FIG. 5 illustrates a block diagram of a sample system that analyzes correlated signals to determine a frequency offset according to other aspects.

In at least one aspect of the subject disclosure, system 400 can include a despreading function 410 for correlating the received signal, and multipath components thereof, with the synchronization sequence(s). Further, the despreading function 410 can be applied to corresponding time segments of the received signal and synchronization sequence(s), where applicable (e.g., if the received signal and synchronization sequence(s) are split into multiple corresponding time based segments by timing module 408). As an example, the despreading function can have the following form:

$$z_j^{(i)}(l) = \sum_{n=0}^{\frac{N}{2}-1} I(l) y^{(i)}(n) x*(n-l)$$

where $z_l^{(i)}(l)$ is a correlated result associated with multipath component l, for PSC/SSC sequence i, and time-based summation j (where applicable); where N is a number of corresponding time segments of the received signal and synchronization sequence (where applicable) and n is an instance of N; where I(l) is a function that removes unqualified multipath components (e.g., I(l) having a value of 0 for unqualified components and 1 for qualified components, see FIG. 5, infra); where $y^{(i)}(n)$ is an $n^{th}$ time segment (where applicable) and an $i^{th}$ instance of the wireless signal received at mobile device receiver 402, and where x*(n-l) is a complex conjugate of an $n^{th}$ time segment (where applicable) of a portion of the PSC/SSC sequence that corresponds to multipath component l.

Processing module 406 can output a resulting correlated signal 412 having two or more separate multipath components. In some aspects, the resulting correlated signal 412 can have multiple correlated time segments. In at least one additional aspect, the resulting correlated signal 412 can include multiple correlations of the received signal with multiple synchronization sequences (e.g. multiple PSCs and/or SSCs transmitted at distinct times by a base station).

Multipath analysis module 414 can receive the resulting correlated signal 412 provided by the processing module 406. Further, the multipath analysis module 414 can evaluate the correlated signal and obtain a frequency offset associated therewith (e.g., pertaining to the received signal and a replica generated at a receiving device). In some aspects, system 400 can comprise a logic module 416 that applies a differential product in conjunction with the evaluation. The differential product can be applied to the two or more separate multipath components of the correlated signal, to time segments of such multipath components, or to correlations with multiple synchronized sequences, or a combination thereof. Results of such differential products can be summed in conjunction with determining the offset frequency. In at least one example, the summed differential product (e.g., across multiple multipath components and multiple time segments) of the resulting correlated signal 410 can have the following form:

$$r^{(i)} = \sum_{l=-L_1}^{L_2} z_j^i(l) \cdot z_{j-1}^i {}^*(l)$$

where $r^{(i)}$ is a sum of multiplying all $z_j^i$ with all complex conjugates of $z_{j-1}^i$, where j and j−1 are distinct instances of a summation of correlated time-based components (e.g., by timing module 408 and processing module 406), over two or more multipath components $L_1$ to $L_2$ (where $L_1+L_2+1$=the number of multipath components) of the correlated signal 412.

A result of an evaluation of the resulting correlated signal 412 by multipath analysis module 414 (e.g., employing one or more differential products utilized by logic module 416) can provide a frequency offset for signal received at a receiving device (404). For instance, a phase of a result of the evaluation can be utilized, in some aspects of the subject disclosure, to determine the frequency offset. As described, system 400 provides a mechanism to employ-multipath components of a received signal to provide a frequency offset of the received signal, and in some cases improve upon frequency offset estimations as compared with single path analysis.

FIG. 5 illustrates a block diagram of a sample system 500 that can analyze a correlated received signal to determine a frequency offset of such received signal. System 500 can include a multipath analysis module 504 that receives a correlated multipath signal, having two or more separate multipath components. The multipath analysis module 504 can evaluate at least one of the separate multipath components to determine an offset frequency appropriate for a wireless signal received at an associated device. The offset frequency can be utilized to analyze, process, etc., the received signal.

System 500 can further include a logic module 506 that employs a despreading function in conjunction with evaluating the correlated multipath signal 502, as described herein. Additionally, system 500 can include a compilation module 508. Compilation module 508 can sum results of two or more differential products employed by the logic module 506. For instance, a sum of time-based correlations, multipath correlations, and/or correlations across multiple synchronized sequences can be conducted by the compilation module 506. The summed differential products can be utilized b the multipath analysis module 504 to provide a more accurate estimate of the offset frequency as compared with a single correlation signal.

In addition to the foregoing, system 500 can include a phase estimator 510. The phase estimator 510 can determine a phase of results of differential products provided by logic module 506 and/or summed results provided by compilation module 508. The phase determined by phase estimator 510 can be utilized, at least in part, by the multipath analysis module 504 to determine the frequency offset of a received signal(s) associated with the correlated multipath signal 502.

Figure 6:
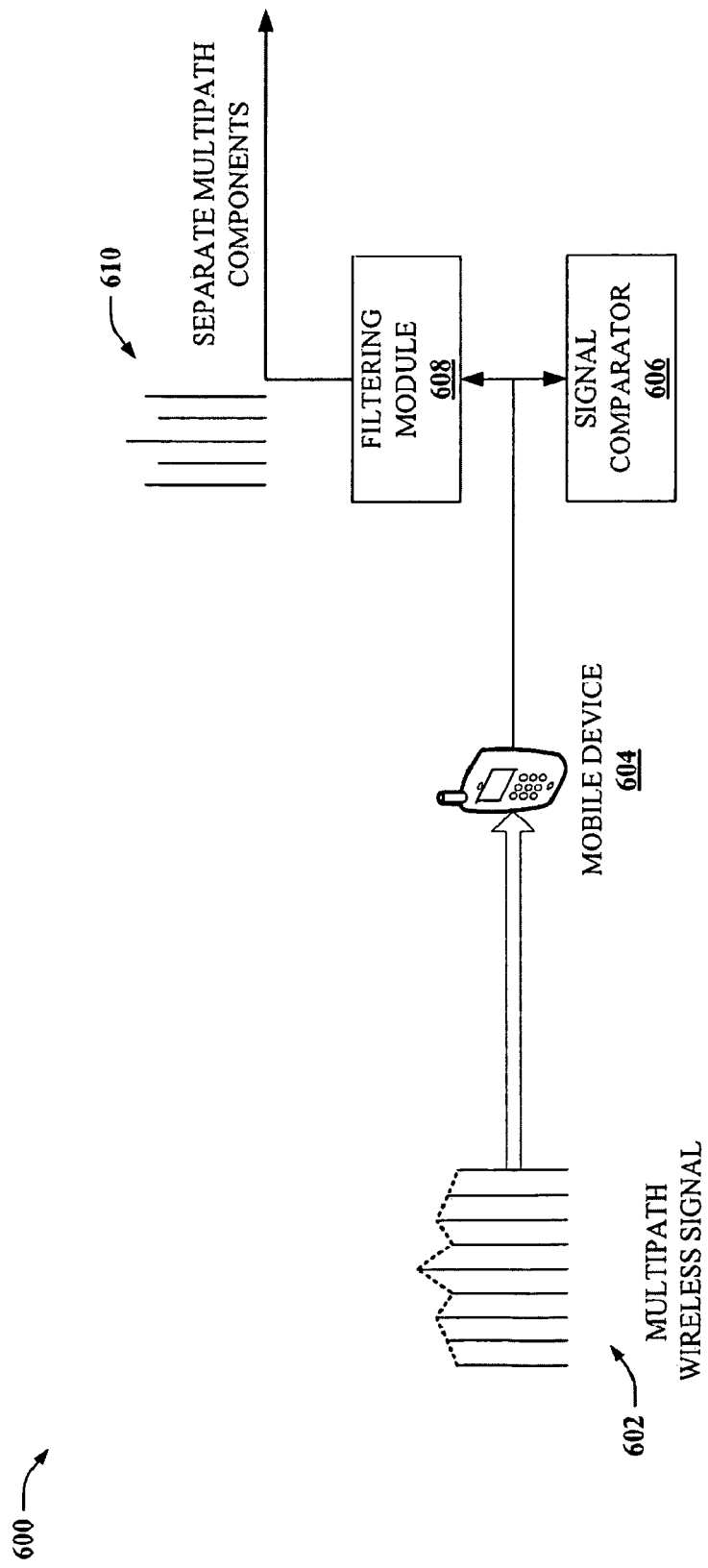
FIG. 6 illustrates a block diagram of a sample system that filters multipath components of a received wireless signal according to further aspects.

FIG. 6 illustrates a block diagram of a sample system 600 that filters multipath components of a received wireless signal 602 according to further aspects. The multipath wireless signal 602 can comprise two or more multipath components received at a mobile device 604. Mobile device 604 call further comprise a signal comparator 606 that determines a dominant signal path of the multipath wireless signal 602. In some aspects, the dominant signal path can be a path with a highest signal strength. In other aspects, the dominant signal path can be a path having a highest signal quality. In yet other aspects, the dominant signal path can be a path having a median timing. In still other aspects, the dominant signal path can be a combination of the foregoing and/or of the like.

A dominant signal path identified by signal comparator 606 can be forwarded to a filtering module 608. Filtering module 608 can then define a threshold range about the strongest signal path and identify two or more significant multipath components. Further, the significant multipath components can be determined with reference to at least one signal parameter. In some aspects, the at least one signal parameter can comprise a path signal strength or normalized path signal strength. In other aspects, the parameter can comprise a number of discreet multipath paths centered about the dominant (e.g., strongest) signal path identified by the signal comparator 606. In still other aspects, the at least one signal parameter can comprise a path signal strength or normalized path signal strength in conjunction with a number of discreet paths centered about the strongest signal path (e.g. see FIG. 7, infra). Significant multipath components 610 identified by the filtering module can be extracted from the multipath wireless signal 602 and output by system 600. Accordingly, system 600 can select multipath components of the multipath wireless signal 602 for analysis.

Figure 7:
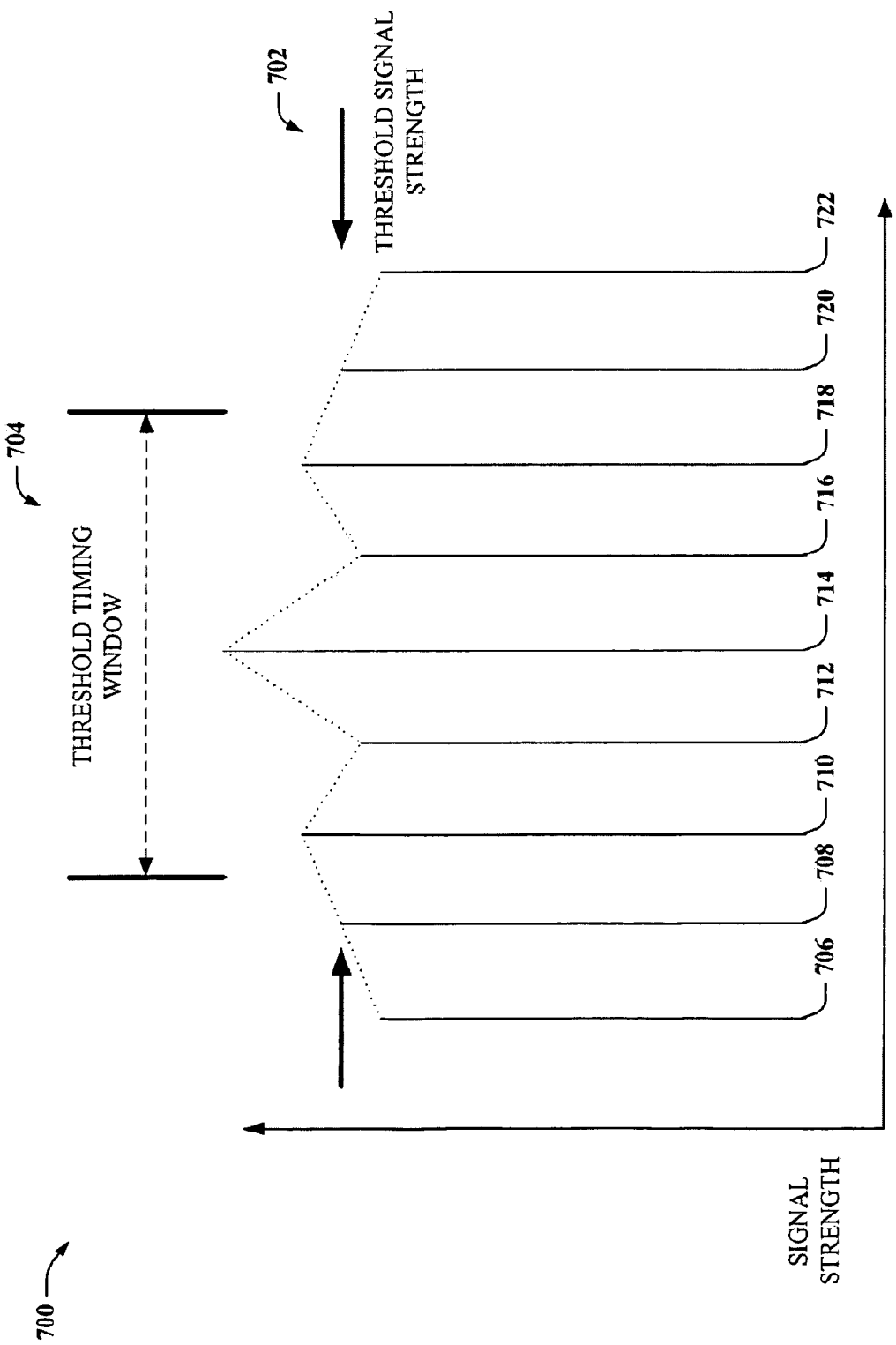
FIG. 7 depicts a block diagram of an example of filtering a received multipath wireless signal according to particular aspects disclosed herein.

FIG. 7 depicts a block diagram of an example of filtering a received multipath wireless signal according to particular aspects disclosed herein. The multipath wireless signal, as received at a receiving device such as a mobile phone, can have multiple multipath components 706, 708, 710, 712, 714, 716, 718, 720, 722. The multipath components 706, 708, 710, 712, 714, 716, 718, 720, 722 typically arrive at distinct points in time, and can be distinguished as a function of time. Furthermore, the multipath components 706, 708, 710, 712, 714, 716, 718, 720, 722 can have varying signal strengths. Accordingly, multipath components 706, 708, 710, 712, 714, 716, 718, 720, 722 can be filtered as a function of time, signal strength, and/or the like.

As an example, a threshold signal strength filter 702 can be employed wherein a component having a signal strength equal to or less than the signal strength filter 702 is selected, and a component that has lower signal strength than the filter 702 can be discarded. As another example, a threshold timing window filter 704 can be employed. The threshold timing window filter 704 can identify a center multipath) component (e.g., component 714) by signal strength, timing, and so on. In addition, the timing window filter 704 can select those components that are within a certain threshold timing of the center multipath component, and discard those components that are outside of the threshold timing. In yet another example, a combination of filters 702, 704 can be utilized to select various multipath components 706, 708, 710, 712, 714, 716, 718, 720, 722. For instance, components within a threshold signal strength of a center component (714), or highest signal strength component (714) can be selected, whereas components below the threshold signal strength of the center/highest component are discarded. Accordingly, various mechanisms can be employed to select and/or discard particular multipath signal paths according to at least one signal characteristic.

Figure 8:
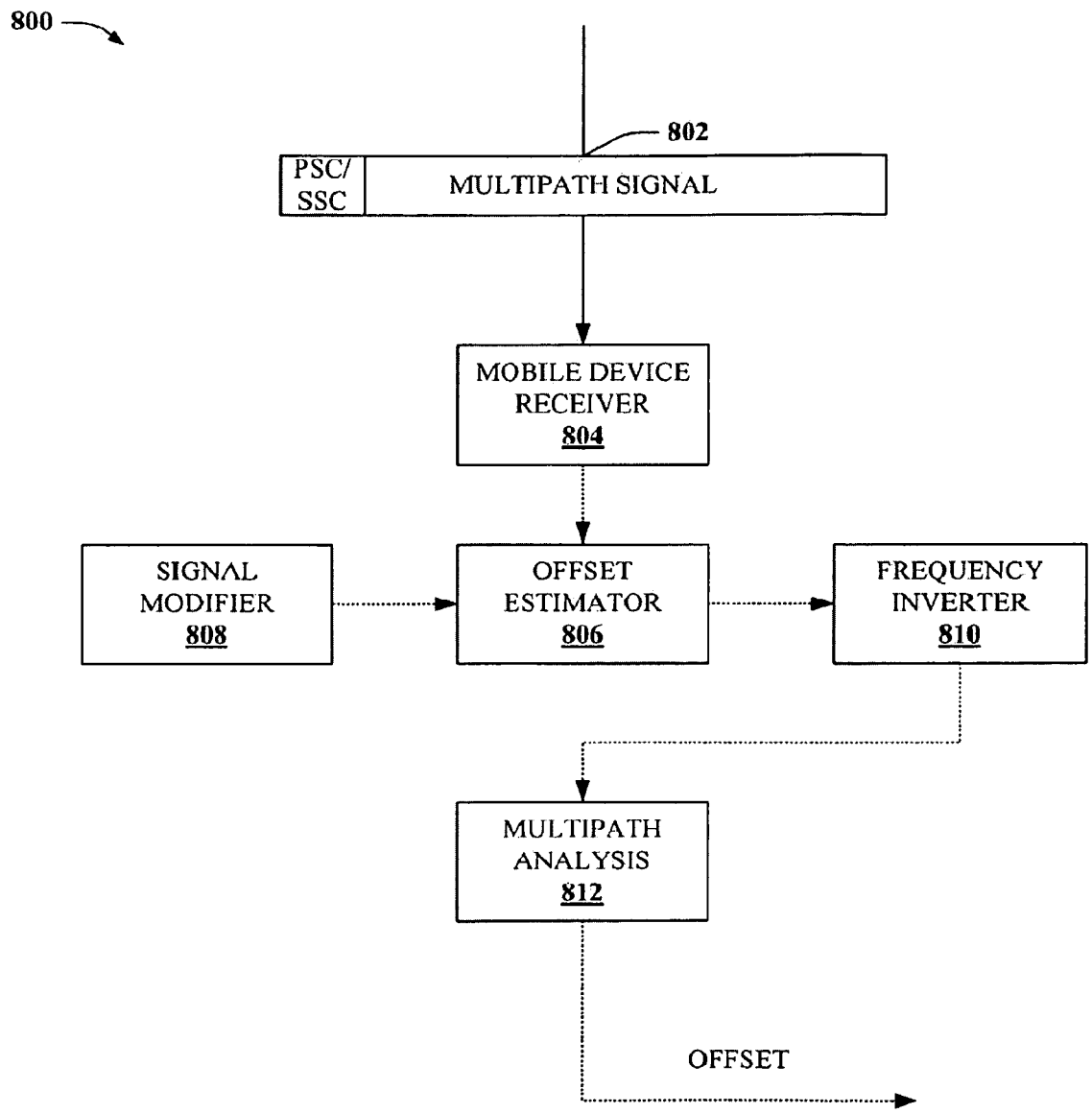
FIG. 8 illustrates a block diagram of an example system that determines a frequency offset of a multipath signal according to still other aspects.

FIG. 8 illustrates a block diagram of an example system 800 that determines a frequency offset of a multipath signal according to still other aspects. System 800 can comprise a mobile device receiver that obtains a multipath wireless signal 802, which comprises or identifies at least one PSC and/or SSC sequence. Furthermore, system 800 can include an offset estimator that obtains an initial frequency offset estimation from the multipath signal 802. As an example, the initial frequency offset estimation can be determined from at least one multipath component associated with the multipath signal 802. In some aspects, a dominant multipath component such as a component having a highest relative signal strength, a greatest relative signal clarity, a center timing, or a combination thereof or of the like, can be selected for the offset estimation. In at least one aspect, the initial frequency offset estimation can be determined by correlating the dominant multipath component with a synchronization sequence, and taking a differential product of the correlated component.

In addition to the foregoing, system 800 can comprise a signal modifier 808. Signal modifier 808 can offset at least a portion of the received signal 802 by the initial frequency offset estimation (e.g., prior to correlation of the received signal 802 with a synchronization sequence). Offsetting the received signal 802 can comprise rotating such signal (802) by the initial frequency offset estimation. In addition, the frequency modifier can convert the offset received signal from a time domain into a frequency domain (e.g., by employing a fast Fourier transform [FFT]) for correlation with a synchronization sequence in the frequency domain (e.g., by a processing module, as described herein).

Furthermore, system 800 can also comprise a frequency inverter 810. Frequency inverter 810 can convert a frequency domain signal (e.g., the offset received signal that is correlated in the frequency domain) into a time domain. By converting a correlated multipath signal into the time domain, correlated multipath components of the correlated multipath signal can be distinguished. The distinct correlated multipath signals can then be forwarded to a multipath analysis module 812 for further evaluation.

In some aspects, a processing module (not depicted) can correlate at least an offset portion of the received signal (802) with multiple synchronization sequences (separated in time). More particularly, correlation can be performed in the frequency domain to obtain multiple correlated signals. Upon converting the multiple correlated signals back to the time domain, multipath components can be distinguished. Further, a logic module (not depicted) can apply a differential product to one or more of the distinct multipath components of the correlated signals, as described herein. The differential products can be summed and a frequency offset of the received signal 802 can be determined from the summed differential products, as described herein (e.g., by determining a phase of the summed differential products). Accordingly, system 800 provides an alternative to correlating received signals in the time domain, and can utilize correlated multipath components across multiple synchronization sequences to provide a relatively accurate frequency offset of a received signal.

Figure 9:
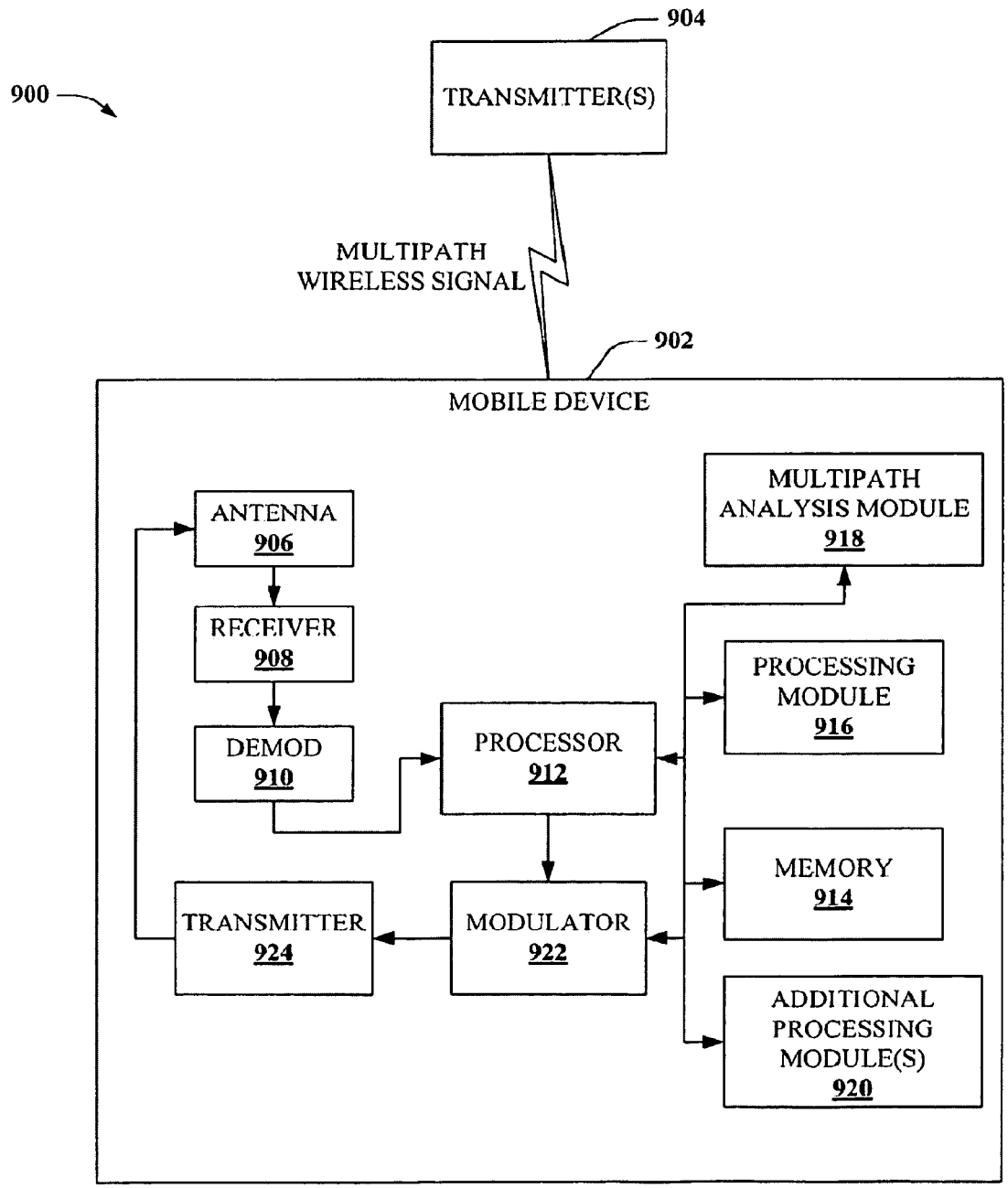
FIG. 9 depicts a block diagram of an example mobile device that can determine a frequency offset of a received signal according to one or more other aspects.

FIG. 9 depicts a block diagram of an example system 900 comprising a mobile device 902 that can determine a frequency offset of a received signal. Mobile device 902 can be configured to implement a handover based on characteristics of source and target wireless channels, as described herein. Accordingly, mobile device 902 can conduct a handover, where appropriate, based on rapid degradation or improvement of source/target channels. Thus, mobile device 900 can facilitate more robust mobile communication, reducing call drop rates in some instances.

Mobile handset 902 includes at least one antenna 906 (e.g., a transmission receiver or group of such receivers comprising an input interface) that receives a signal (e.g., a wireless multipath signal) and a receiver 908, which performs typical actions (e.g., filters, amplifies, down-converts, etc.) on the received signal. Specifically, antenna 906 and transmitter 930 (collectively referred to as a transceiver) can be configured to facilitate wireless data exchange with transmitter 904 (e.g., a base station).

Antenna 906 and receiver 908 can also be coupled with a demodulator 910 that can demodulate received symbols and provide them to a processor 912 for evaluation. In one example, antenna 906, receiver 908 and/or demodulator 910 can be configured to receive a multipath signal and generate a replica of the multipath signal at mobile device 902. Processor 912 can analyze information received by antenna 906 and/or generate information for transmission by a transmitter 924. Additionally, processor 912 can control and/or reference one or more components (906, 908, 910, 914, 916, 918, 920, 922, 924) of the mobile handset 902. Further, processor 912 can execute one or more modules, applications, engines, or the like (916, 918, 920) that comprise information or controls pertinent to executing functions of the mobile device 902. For instance, such functions can include receiving data from a remote source (904), correlating a received multipath signal with a synchronization sequence, evaluating the resulting correlated signal and determining a frequency offset of the received signal, or the like, as described herein.

Mobile handset 902 can additionally include memory 914 that is operatively coupled to processor 912. Memory 914 can store data to be transmitted, received, and the like. Further, memory 914 can store one or more program modules (916, 918, 920) pertinent to correlating signals or determining an offset frequency of received signals, as described herein. For instance, a processing module 916 that can correlate one or more received multipath signals with one or more synchronization sequences can be stored in memory 914. Furthermore, a multipath analysis module 918 configured to evaluate correlated multipath components of the one or more correlated signals can be stored in memory 914. Additional processing modules 920, that can separate a signal into multiple time segments, apply differential product algorithms, determine phase of differential product results, convert signals to and from a time domain and frequency domain, or the like, as described herein can be stored in memory 914.

Mobile handset 602 can still further comprise a modulator 922, and a transmitter 924 that transmits generated signals (e.g., generated by processor 912 and modulator 922) to, for instance, transmitter 904, an access point, another access terminal, a remote agent, etc. As described, system 900 provides a mobile device 602 that can determine an offset frequency of a received multipath signal with respect to a replicated signal generated at the mobile device 902. By utilizing multipath components for such determination, accuracy of the offset frequency can be improved as compared with single signal analysis techniques.

Figure 10:
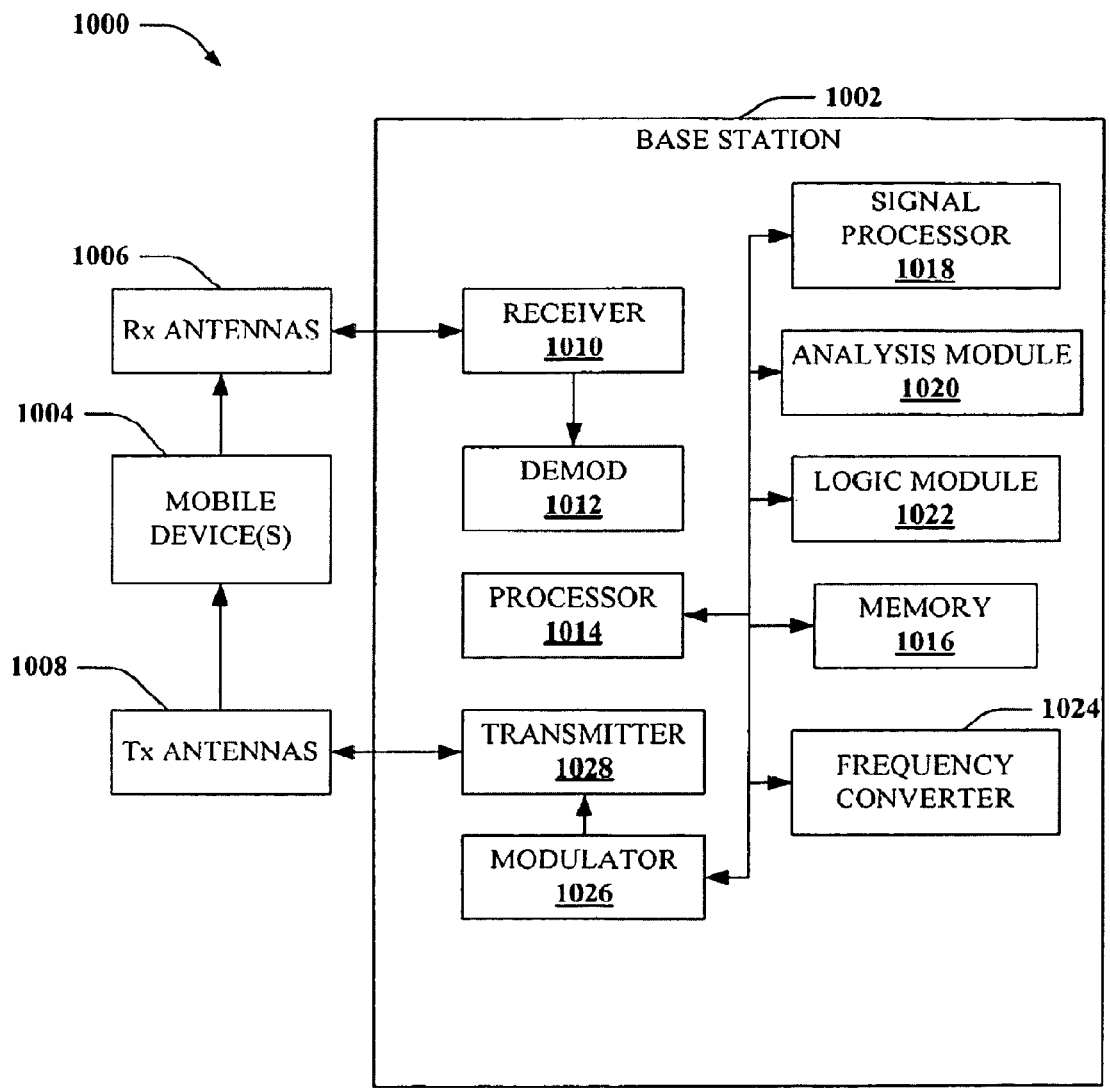
FIG. 10 illustrates a block diagram of an example base station that can facilitate determining a frequency offset of wireless signals received at a mobile device.

FIG. 10 illustrates a block diagram of an example system 1000 comprising a base station 1002 that can facilitate determining a frequency offset of wireless signals received at a mobile device. Base station 1002 can be communicatively coupled with a mobile device(s) 1004 via a wireless channel. Wireless signals can be exchanged between the base station 1002 and mobile device(s) 1004 utilizing the wireless channel. In some aspects, a wireless signal transmitted by the base station 1002 can be received at the mobile device(s) 1004 and replicated at such device(s) 1004. The replicated signal can be forwarded to the base station 1002, which can determine a frequency offset for the mobile device(s) 1004. Accordingly, frequency offset estimation can be conducted at a base station 1002 communicatively coupled with the mobile device(s) 1004.

Base station 1002 (e.g., an access point, etc.) can comprise a receiver 1010 that receives signal(s) from one or more mobile devices 1004 through a plurality of receive antennas 1006, and a transmitter 1030 that transmits to the one or more mobile devices 1004 through a transmit antenna(s) 1008. Receiver 1010 can receive information from receive antennas 1006 and can further comprise a signal recipient (not shown) that receives uplink data scheduled in accordance with a transmission allocation period provided by base station 1002. Additionally, receiver 1010 is operatively associated with a demodulator 1012 that demodulates received information. Demodulated symbols are analyzed by a processor 1014 that is coupled to a memory 1016 that stores information related to receiving wireless signals transmitted by the mobile device(s) 1004, correlating the received signals with a synchronization sequence, determining an offset frequency for transmitted signal received at the mobile device(s) 1004, and forwarding the offset frequency to the mobile device(s) 1004, and/or any other suitable information related to performing the various actions and functions set forth herein.

Processor 1014 is further coupled to a signal processor 1018 that can correlate a wireless signal with a synchronization sequence (e.g., wherein a logic module 1022 employs a despreading function for correlating a multipath signal generated at the mobile device(s) 1004) For instance, signal processor can obtain a signal generated at mobile device(s) 1004 that is a replica of a signal received at such device(s) 1004. Further, the signal processor can correlate the replica or the signal received at the mobile device(s) 1004 with one or more synchronization sequences. The correlated signals can comprise distinct multipath components. Such components can be forwarded to a multipath analysis module 1020.

Processor 1014 can be further coupled to the multipath analysis module 1020 that can determine a frequency offset between wireless signals received at the mobile device(s) 1004 and replicas of such signals generated at such device(s) 1004. More specifically, the multipath analysis module 1020 can evaluate distinct correlated multipath signals (e.g., provided by signal processor 1018) to determine the frequency offset. In at least one aspect, the multipath analysis module 1020 can employ a differential product in conjunction with determining the frequency offset.

In at least one additional aspect, the signal processor 1018 can correlate a signal generated by the mobile device(s) 1004 (e.g., a replica of a wireless transmission received at such devices 1004) with two or more additional synchronization sequences. Further, the correlation can provide two or more correlated signals containing distinct multipath components. In at least one aspect, correlation with multiple synchronization sequences can be conducted in a frequency domain. Moreover, a frequency converter 1024 can transform the resulting correlated signals into a time domain to distinguish the multipath components. According to still other aspects, multipath analysis module 1020 can obtain a frequency offset of the mobile generated signal and the mobile received signal by applying a differential product to corresponding multipath components of the two or more correlated signals. The frequency offset can be transmitted by the base station 1002 to the mobile device(s) 1004 (e.g., by way of modulator 1026 and transmitter 1028) for processing and analyzing signals received at such device(s) 1004. Accordingly, system 1000 provides an alternative mechanism for calculating offset frequencies for mobile device(s) 1004 at a common base station 1002.

The aforementioned systems have been described with respect to interaction between several components, modules and/or electronic interface functions. It should be appreciated that such systems and components/modules/functions can include those components or sub-components specified therein, some of the specified components or sub-components, and/or additional components. For example, a system could include mobile device 304, processing module 306, multipath analysis module 308, timing module 408, and compilation module 508, or a different combination of these and/or other components. Sub-components could also be implemented as components communicatively coupled to other components rather than included within parent components. Additionally, it should be noted that one or more components could be combined into a single component providing aggregate functionality. For instance, compilation module 508 can include phase estimator 510, or vice versa, to facilitate summing signal evaluation results and determining a phase of such results by way of a single component. The components can also interact with one or more other components not specifically described herein but known by those of skill in the art.

Furthermore, various portions of the disclosed systems can include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers ... ). Such components, inter alia, and in addition to that already described herein, can automate certain mechanisms or processes performed thereby to make portions of the systems more adaptive as well as efficient and intelligent.

Figure 11:
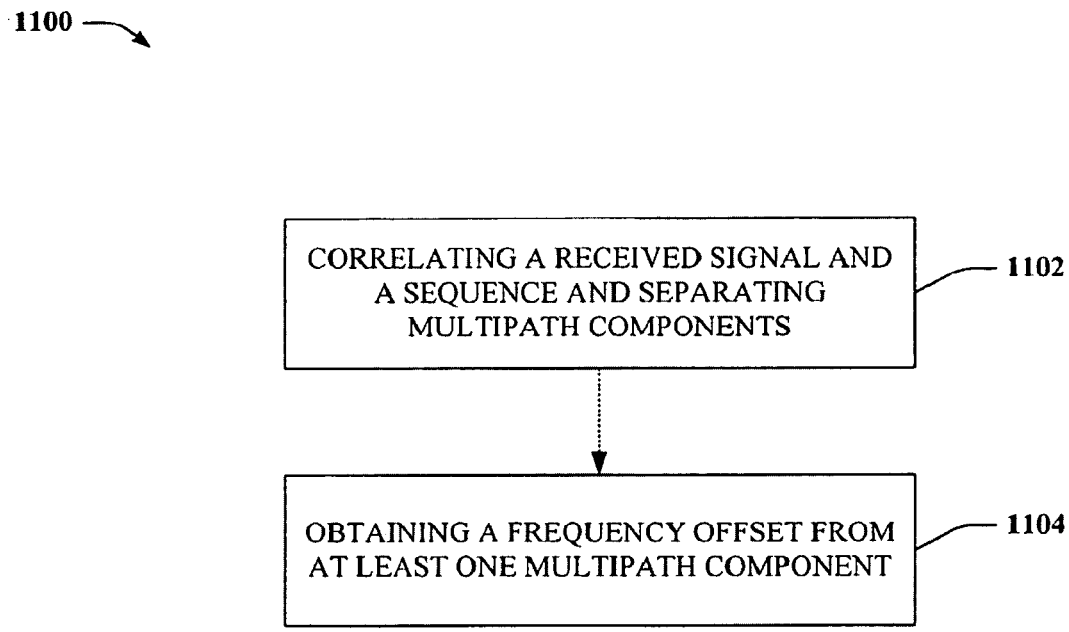
FIG. 11 illustrates a sample methodology for determining a frequency offset from multipath components of a received wireless signal.
Figure 12:
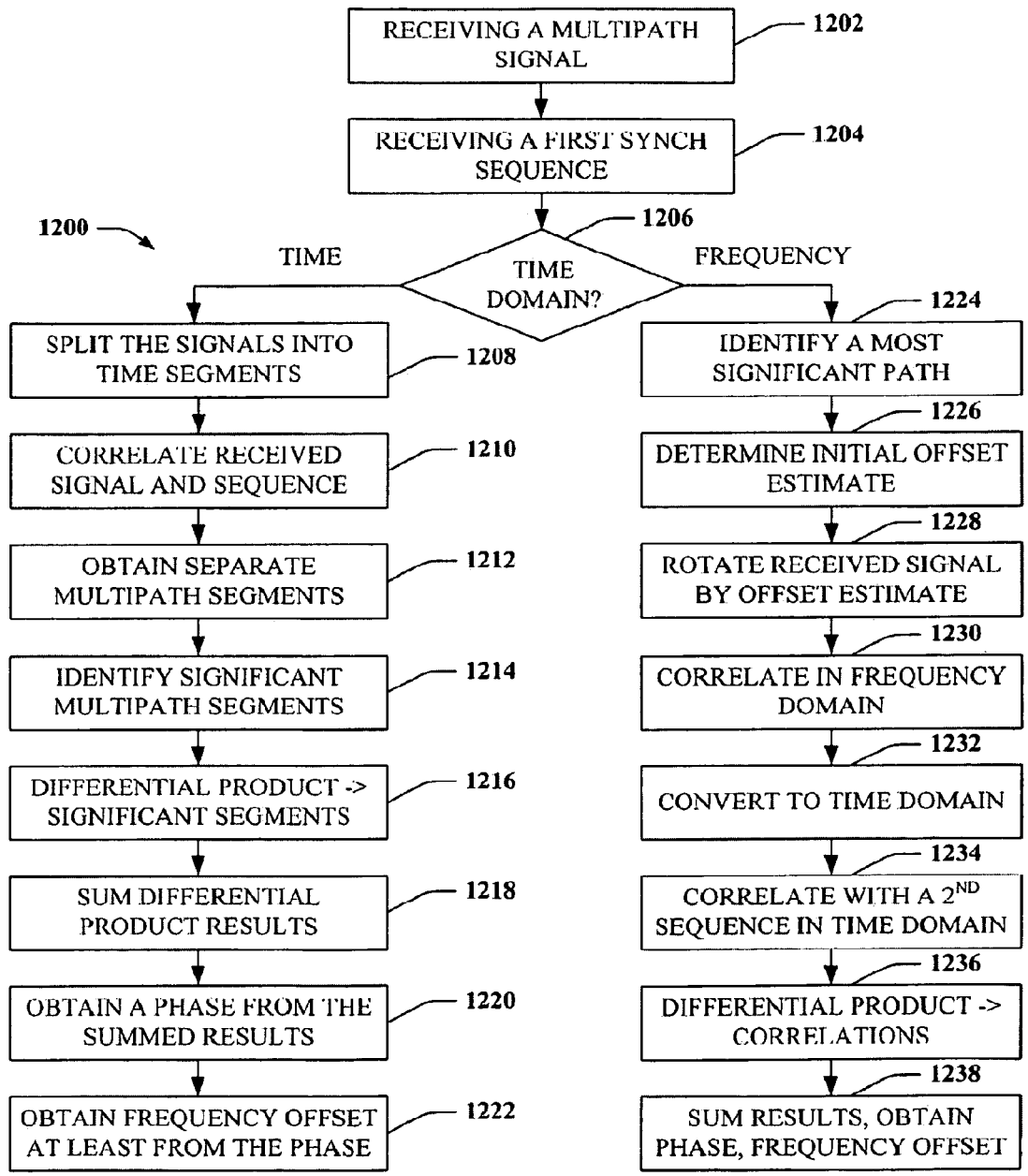
FIG. 12 depicts an example methodology for determining a frequency offset of a received wireless signal according to one or more other aspects.
Figure 13:
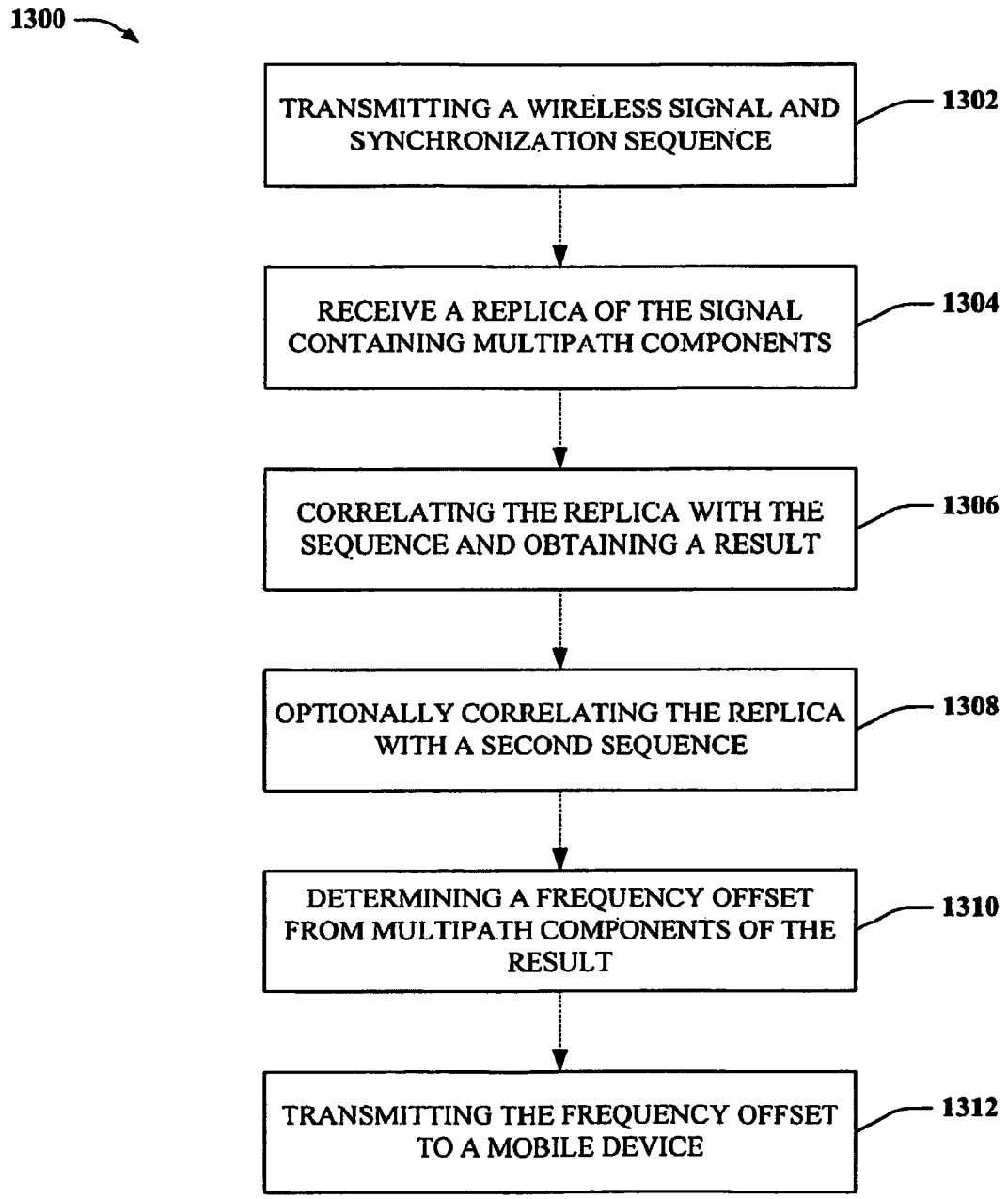
FIG. 13 illustrates an example methodology for facilitating determination of a frequency offset of a wireless signal received at a mobile device.

Referring to FIGS. 11-13, methodologies relating to conducting and/or facilitating determination of offset frequency for received wireless signals are depicted. While, for purposes of simplicity of explanation, the methodologies are shown and described as a series of acts, it is to be understood and appreciated that the methodologies are not limited by the order of acts. For example, in accordance with one or more aspects, some acts can occur in different orders and/or concurrently with other acts from that shown and described herein. In addition, those skilled in the art will understand and appreciate that a methodology could alternatively be represented as a series of interrelated states or events, such as in a state diagram. Moreover, not all illustrated acts are necessarily required to implement a methodology in accordance with one or more aspects.

FIG. 11 illustrates a sample methodology 1100 for determining a frequency offset from multipath components of a received wireless signal. At 1102, method 1100 can correlate a received signal with a synchronization sequence. Further, a result of the correlation can comprise two or more separate multipath components. The received signal can be any suitable wireless transmission, received at a wireless device (e.g., by an antenna), which contains at least two multipath components. Further, the synchronization sequence can comprise a PSC, an SSC, or a suitable combination thereof or of the like.

At 1104, method 1100 can analyze at least one of the two or more separate multipath components. The analysis can be utilized to obtain a frequency offset of the received signal (e.g., in comparison with a device-generated replica of the received signal). In some aspects, the analysis can comprise applying a differential product the one or more of the separate multipath components. In still other aspects, the differential product can be applied to corresponding time-based segments of the multipath components. For instance, the differential products can be summed, and a phase of the summation utilized, at least in part, to determine the frequency offset. By utilizing multiple components for evaluation of the frequency offset, such an offset can be determined with greater accuracy as compared with single-signal analysis techniques.

FIG. 12 depicts an example methodology 1200 for determining a frequency offset of a received wireless signal according to one or more other aspects. At 1202, method 1200 can receive a multipath signal. The multipath signal can be any suitable wireless transmission, having two or more multipath components at a receiver. At 1204, method 1200 can receive or identify a first synchronization sequence. At 1206, a determination can be made as to whether analysis of the received multipath signal is to be done in a time domain or a frequency domain. If analysis is done in the time domain, method 1200 can proceed to 1208. Otherwise, method 1200 proceeds to 1224.

At 1208, method 1200 can split the multipath components and synchronization sequence(s) into multiple corresponding time segments. At 1210, the corresponding multipath component segments and synchronization sequence segments can be correlated, and summed over a portion or all of the time segments. In some aspects, the correlated signals can be summed over two or more groups of the time segments. In addition, according to one or more other aspects, correlation can be implemented by employing a despreading function, as described herein.

At 1212, separate correlated multipath segments can be obtained from the correlated signals. At 1214, significant multipath components of the correlated signals can be identified. The significant multipath components can be filtered as a function of signal strength, signal quality, timing, or a combination thereof or of the like.

At 1216, method 1200 can apply a differential product to the significant correlated multipath segments. At 1218, results of the differential products can be summed. Furthermore, at 1220, a phase can be obtained from the sum differential products. Moreover, at 1222, a frequency offset of the received multipath signal (e.g., at reference number 1202) and a replica of the received multipath signal (e.g., generated at a receiver) can be determined and utilized to decode, process, analyze, etc., the received multipath signal.

At reference number 1224, method 1200 can identify a most significant path of the multipath signal. Such most significant path can be a function of path signal strength, signal quality, timing, and so on. At 1226, an initial frequency offset estimation is obtained at least in part from the most significant path of the multipath signal. For instance, such path can be segmented in time, or across multiple sequences, correlated and analyzed to determine the frequency offset, as described herein.

At 1228, method 1200 can rotate the received multipath signal by the initial frequency offset estimation. At 1230, the rotated signal can be correlated a first synchronization sequence in a frequency domain. At 1232, the correlated signal(s) is converted to the time domain, and multipath components of such correlated signal(s) are distinguished.

At 1234, method 1200 can correlate the rotated signal with a second synchronization sequence in the time domain. At 1236, a differential product of multipath segments of the first correlated signal and of corresponding multipath segments of the second correlated signal can be determined. At 1238, the differential product results can be summed, a phase obtained from the sum, and a frequency offset obtained at least in part from the phase. As described, method 1200 can correlated and evaluate received signals in a time domain or in a frequency domain. Accordingly, method 1200 provides additional flexibility to various aspects associated with determining a frequency offset of a received wireless signal disclosed herein.

FIG. 13 illustrates an example methodology 1300 for facilitating determination of a frequency offset of a wireless signal received at a mobile device. At 1302, method 1300 can transmit a wireless signal and a synchronization sequence. At 1304, method 1300 can receive a replica of the wireless signal, generated at a receiving mobile device. Further, the received replica can contain multipath components incident at the receiving mobile device.

At 1306, method 1300 can correlate the received replica with at least the synchronization sequence, and obtain result of the correlation. The correlation(s) can be conducted utilizing a despreading function, as described herein. Further, the correlation(s) can be conducted in a time domain or a frequency domain. At 1308, method 1300 can optionally correlate the received replica with a second synchronization sequence in a frequency domain. At 1310, a frequency offset can be determined from multipath components of the result of the correlated signals. In one aspect, the frequency offset can be obtained by applying a differential product across multiple synchronization sequences, correlated with the received replica in the frequency domain. In another aspect, the frequency offset can be obtained by applying a differential product to time based segments of the correlated multipath components. Once determined, the frequency offset can be transmitted to the receiving mobile device at 1312.

As described, a receiving mobile device can utilize a frequency offset determined by method 1300 in demodulating, processing, and/or analyzing received wireless communications. Furthermore, method 1300 enables a wireless transmitter, such as a base station, to act as a common entity for determining offset frequencies associated with mobile devices coupled with the base station. Moreover, the offset frequencies can be determined utilizing two or more multipath components, improving the accuracy of such determinations.

Figure 14:
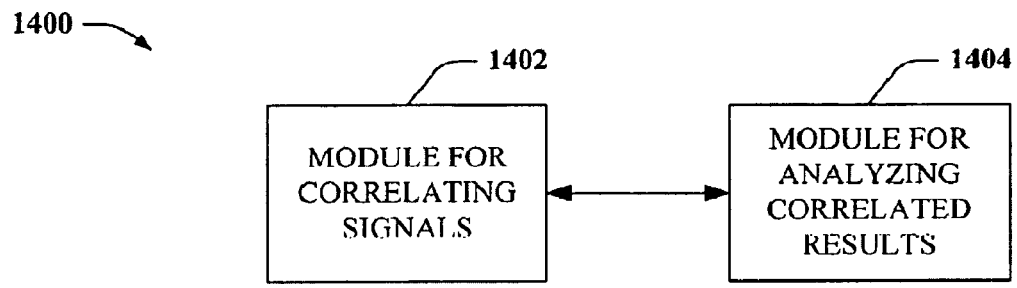
FIGS. 14 and 15 depict block diagrams of example systems that facilitate determining a frequency offset of wireless signals received at a mobile device.
Figure 15:
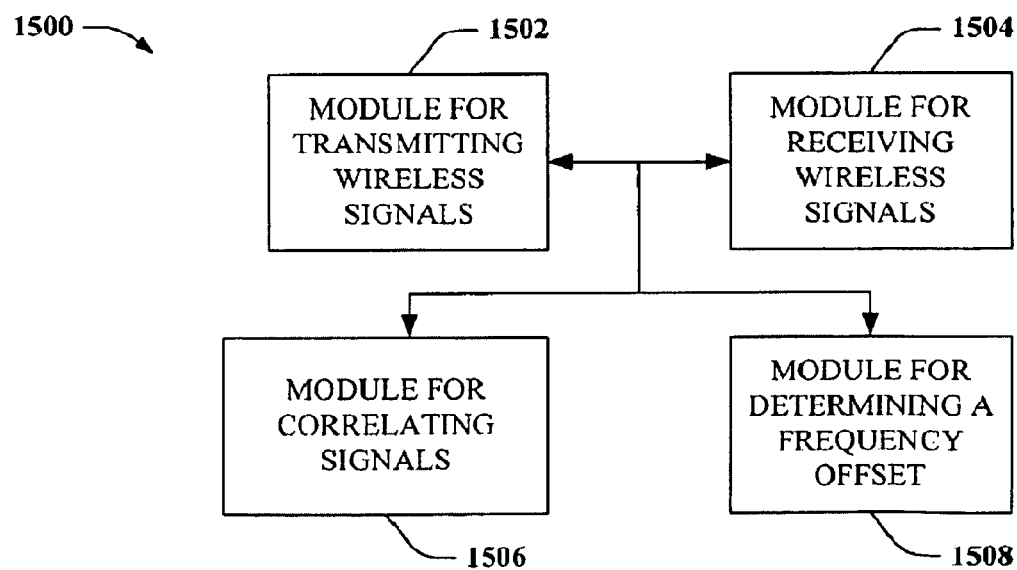

FIGS. 14 and 15 depict block diagrams of example systems 1400 and 1500, respectively, which facilitate determining a frequency offset of wireless signals received at a mobile device. System 1400 can include a first module 1402 for correlating received wireless signals with one or more synchronization sequences. Further, module 1402 can obtain a resulting correlated signal that comprises two or more separate multipath components. In addition, system 1400 can include a second module 1404 for analyzing at least one of the two or more separate multipath components. Moreover, module 1404 can obtain a frequency offset of the received signal from such analysis. By generating multipath correlations and analyzing one or more such correlations, improved estimates of the offset frequency can be generated as compared with single signal techniques.

System 1500 can include a first module 1502 for transmitting a wireless signal and a synchronization sequence. The wireless signal can include two or more multipath components as received at a mobile device (not depicted). Furthermore, system 1500 can include a second module 1504 for receiving from the mobile device a replica of the wireless signal, which is generated at the mobile device. In some aspects, the replica can comprise at least two multipath components that are received at the mobile device. In addition, system 1500 can include a third module 1506 for correlating the replica of the wireless signal with the synchronization sequence transmitted by the first module 1502. A resulting correlated signal can comprise at least two distinct multipath components that are received at the mobile device. Furthermore, system 1500 can also include a fourth module 1508 for determining a frequency offset between the wireless signal and the replica of the wireless signal from one or more of the at least two distinct multipath components. The frequency offset can be forwarded to the mobile device and utilized to process or analyze the wireless signal transmitted by the first module 1502.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of wireless communication, comprising:
    correlating a received signal with a synchronization sequence comprising a primary synchronization channel (PSC) sequence, a secondary synchronization channel (SSC) sequence, or a combination thereof, wherein a resulting correlated signal comprises two or more separate multipath components;
    analyzing at least one of the two or more separate multipath components and obtaining a frequency offset of the received signal from the analysis;
    splitting the received signal and the synchronization sequence into a plurality of time segments, wherein the correlating is applied to corresponding time segments of the received signal and synchronization sequence;
    obtaining a plurality of correlated time segments for each of the two or more separate multipath components;
    applying a differential product to correlated time segments of the at least one of the two or more separate multipath components, wherein the frequency offset of the received signal is obtained at least in part from a result of the differential product;
    applying the differential product to correlated time segments of an additional multipath component of the two or more separate multipath components;
    summing results of the differential products of the at least one multipath component and the additional multipath component; and
    obtaining the frequency offset from a phase of the sum of the results of the differential products.

2. A method of wireless communication, comprising:
    correlating a received signal with a synchronization sequence comprising a primary synchronization channel (PSC) sequence, a secondary synchronization channel (SSC) sequence, or a combination thereof, wherein a resulting correlated signal comprises two or more separate multipath components;
    analyzing at least one of the two or more separate multipath components and obtaining a frequency offset of the received signal from the analysis;
    obtaining an initial frequency offset estimation from at least one multipath signal associated with the received signal;
    offsetting at least a portion of the received signal by the initial frequency offset estimation prior to the correlating, wherein the correlating the received signal with the synchronization sequence is accomplished in a frequency domain;
    converting the resulting correlated signal to a time domain signal to distinguish the two or more separate multipath components;
    correlating at least the offset portion of the received signal with an additional synchronization sequence to obtain a second resulting correlated signal, the additional synchronization sequence is separated in time from the synchronization sequence;
    applying a differential product to at least one multipath component of the resulting correlated signal and to at least one multipath component of the second resulting correlated signal; and
    obtaining the frequency offset from a result of the differential product(s).

3. The method of claim 2, further comprising employing a despreading function for correlating the received signal with the synchronization sequence.

4. The method of claim 2, further comprising applying the differential product to at least two of the two or more separate multipath components and summing the results of the differential products.

5. The method of claim 4, further comprising obtaining the frequency offset at least in part based on a phase of the sum of the results of the differential products.

6. The method of claim 2, further comprising splitting the received signal and the synchronization sequence into a plurality of time segments, wherein the correlating is applied to corresponding time segments of the received signal and synchronization sequence.

7. The method of claim 6, further comprising:
    obtaining a plurality of correlated time segments for each of the two or more separate multipath components.

8. The method of claim 7, further comprising:
    applying the differential product to correlated time segments of the at least one of the two or more separate multipath components, wherein the frequency offset of the received signal is obtained at least in part from a result of the differential product.

9. The method of claim 2, further comprising determining a strongest signal path of the received signal.

10. The method of claim 9, further comprising defining a threshold range about the strongest signal path and identifying two or more significant multipath components based on at least one signal parameter.

11. The method of claim 10, further comprising employing at least one of the following as one of the at least one signal parameter:
path signal strength or normalized path signal strength;
a number of discreet paths centered about the strongest signal path; or
path signal strength or normalized path signal strength in conjunction with a number of discreet paths centered about the strongest signal path.

12. The method of claim 10, further comprising applying the differential product to the significant multipath components and obtaining the frequency offset at least in part on results of the differential products.

13. An apparatus that provides wireless communication, comprising:
a processing module that correlates a received signal with a synchronization sequence comprising a primary synchronization channel (PSC) sequence, a secondary synchronization channel (SSC) sequence, or a combination thereof, wherein a resulting correlated signal comprises two or more separate multipath components;
a multipath analysis module that evaluates at least one of the two or more separate multipath components and obtains a frequency offset of the received signal;
a logic module that applies a differential product to significant multipath components, wherein the multipath analysis module obtains the frequency offset at least in part on results of the differential products;
a signal modifier that offsets at least a portion of the received signal by the initial frequency offset estimation prior to the correlation by the processing module, wherein the processing module correlates the received signal with the synchronization sequence in a frequency domain; and
a frequency inverter that converts the resulting correlated signal to a time domain to distinguish the two or more separate multipath components;
wherein, the processing module correlates at least the offset portion of the received signal with an additional synchronization sequence to obtain a second resulting correlated signal, the additional synchronization sequence is separated in time from the synchronization sequence;
a logic module applies a differential product to at least one multipath component of the resulting correlated signal and to at least one multipath component of the second resulting correlated signal; and
the multipath analysis module obtains the frequency offset from a result of the differential product(s).

14. The apparatus of claim 13, wherein the processing module employs a despreading function to correlate the received signal with the synchronization sequence.

15. The apparatus of claim 13, further comprising a compilation module that sums results of two or more differential products, the logic module applies the differential product to at least two of the two or more separate multipath components and the compilation module sums the results of the differential products.

16. The apparatus of claim 15, further comprising a phase estimator that determines a phase of the sum of the results of the differential products, the multipath analysis module utilizes the phase, at least in part, to obtain the frequency offset of the received signal.

17. The apparatus of claim 15, further comprising a timing module that splits the received signal and the synchronization sequence into a plurality of time segments, the processing module correlates corresponding time segments of the received signal and the synchronization sequence.

18. The apparatus of claim 17, wherein:
the timing module obtains a plurality of correlated time segments for each of the two or more separate multipath components.

19. The method of claim 18, wherein the logic module applies a differential product to correlated time segments of the at least one of the two or more separate multipath components, wherein the frequency offset of the received signal is obtained at least in part from a result of the differential product.

20. The apparatus of claim 13, further comprising a signal comparator that determines a strongest signal path of the received signal.

21. The apparatus of claim 20, further comprising a filtering module that defines a threshold range about the strongest signal path and identifies two or more significant multipath components based on at least one signal parameter.

22. The apparatus of claim 21, wherein the filtering module employs at least one of the following as one of the at least one signal parameter:
path signal strength or normalized path signal strength;
a number of discreet paths centered about the strongest signal path; or
path signal strength or normalized path signal strength in conjunction with a number of discreet paths centered about the strongest signal path.

23. The apparatus of claim 21, further comprising a logic module that applies a differential product to the significant multipath components, wherein the multipath analysis module obtains the frequency offset at least in part on results of the differential products.

24. An apparatus that provides wireless communication, comprising:
means for correlating a received signal with a synchronization sequence comprising a primary synchronization channel (PSC) sequence, a secondary synchronization channel (SSC) sequence, or a combination thereof, wherein a resulting correlated signal comprises two or more separate multipath components;
means for analyzing at least one of the two or more separate multipath components and for obtaining a frequency offset of the received signal from the analysis;
means for obtaining an initial frequency offset estimation from at least one multipath signal associated with the received signal;
means for offsetting at least a portion of the received signal by the initial frequency offset estimation prior to the correlation by the processing module, wherein the processing module correlates the received signal with the synchronization sequence in a frequency domain; and
means for converting the resulting correlated signal to a time domain to distinguish the two or more separate multipath components;
wherein, the means for correlating correlates at least the offset portion of the received signal with an additional synchronization sequence to obtain a second resulting correlated signal, the additional synchronization sequence is separated in time from the synchronization sequence;
means for applying a differential product to at least one multipath component of the resulting correlated signal and to at least one multipath component of the second resulting correlated signal; and
the means for analyzing obtains the frequency offset from a result of the differential product(s).

25. A computer program product, comprising:
a non-transitory computer-readable medium comprising:
code for correlating a received signal with a synchronization sequence comprising a primary synchronization channel (PSC) sequence, a secondary synchronization channel (SSC) sequence, or a combination thereof, wherein a resulting correlated signal comprises two or more separate multipath components;
code for analyzing at least one of the two or more separate multipath components and obtain a frequency offset of the received signal from the analysis;
code for obtaining an initial frequency offset estimation from at least one multipath signal associated with the received signal;
code for offsetting at least a portion of the received signal by the initial frequency offset estimation prior to the correlating, wherein the correlating the received signal with the synchronization sequence is accomplished in a frequency domain;
code for converting the resulting correlated signal to a time domain signal to distinguish the two or more separate multipath components;
code for correlating at least the offset portion of the received signal with an additional synchronization sequence to obtain a second resulting correlated signal, the additional synchronization sequence is separated in time from the synchronization sequence;
code for applying a differential product to at least one multipath component of the resulting correlated signal and to at least one multipath component of the second resulting correlated signal; and
code for obtaining the frequency offset from a result of the differential product(s).

26. A method of wireless communication, comprising:
transmitting a wireless signal and a synchronization sequence comprising a primary synchronization channel (PSC) sequence, a secondary synchronization channel (SSC) sequence, or a combination thereof;
receiving a replica of the wireless signal, the replica comprises at least two multipath components;
correlating the replica of the wireless signal with the synchronization sequence, wherein a resulting correlated signal comprises at least two distinct multipath components; and
determining a frequency offset between the wireless signal and the replica of the wireless signal from one or more of the at least two distinct multipath components;
correlating the replica of the wireless signal with a second synchronization sequence to obtain a second resulting correlated signal, the correlating with the synchronization sequence and the second synchronization sequence are implemented in a frequency domain;
converting the resulting correlated signal and the second resulting correlated signal to a time domain; and
applying a differential product to corresponding multipath components of the resulting correlated signal and the second resulting correlated signal to obtain the frequency offset.

27. The method of claim 26, further comprising transmitting the frequency offset to a mobile device.

28. The method of claim 26, further comprising employing a despreading function to correlate the replica of the wireless signal with the synchronization sequence.

29. An apparatus that facilitates wireless communication, comprising:
a transmitter that sends a wireless signal and a synchronization sequence comprising a primary synchronization channel (PSC) sequence, a secondary synchronization channel (SSC) sequence, or a combination thereof;
a receiver that obtains a replica of the wireless signal, the replica comprises at least two multipath components;
a signal processor that correlates the replica of the wireless signal with the synchronization sequence, wherein a resulting correlated signal comprises at least two distinct multipath components; and
an analysis module that determines a frequency offset between the wireless signal and the replica of the wireless signal from one or more of the at least two distinct multipath components, wherein the signal processor correlates the replica of the wireless signal with a second synchronization sequence to obtain a second resulting correlated signal, the correlating with the synchronization sequence and the second synchronization sequence are implemented in a frequency domain; and
a frequency converter that transforms the resulting correlated signal and second resulting correlated signal to a time domain; wherein the analysis module applies a differential product to corresponding multipath components of the resulting signal and the second resulting signal to obtain the frequency offset.

30. The apparatus of claim 29, wherein the transmitter sends the frequency offset to a mobile device.

31. The apparatus of claim 29, further comprising a logic module that employs a despreading function to correlate the replica of the wireless signal with the synchronization sequence.

32. An apparatus that provides wireless communication, comprising: means for transmitting a wireless signal and a synchronization sequence comprising a primary synchronization channel (PSC) sequence, a secondary synchronization channel (SSC) sequence, or a combination thereof;
means for receiving from a replica of the wireless signal, the replica comprises at least two multipath components;
means for correlating the replica of the wireless signal with the synchronization sequence, wherein a resulting correlated signal comprises at least two distinct multipath components;
means for determining a frequency offset between the wireless signal and the replica of the wireless signal from one or more of the at least two distinct multipath components, wherein the means for correlating correlates the replica of the wireless signal with a second synchronization sequence to obtain a second resulting correlated signal, the correlating with the synchronization sequence and the second synchronization sequence are implemented in a frequency domain; and
means for transforming the resulting correlated signal and the second resulting correlated signal to a time domain, wherein the means for determining applies a differential product to corresponding multipath components of the resulting correlated signal and the second resulting correlated signal to obtain the frequency offset.

33. A non-transitory computer-readable medium, comprising:
computer-readable instructions configured to provide wireless communication, the instructions are executable by at least one computer to:
transmit a wireless signal and a synchronization sequence comprising a primary synchronization channel (PSC) sequence, a secondary synchronization channel (SSC) sequence, or a combination thereof;
receive a replica of the wireless signal, the replica comprises at least two multipath components;

correlate the replica of the wireless signal with the synchronization sequence, wherein a resulting correlated signal comprises at least two distinct multipath components;

determine a frequency offset between the wireless signal and the replica of the wireless signal from one or more of the at least two distinct multipath components;

correlate the replica of the wireless signal with a second synchronization sequence to obtain a second resulting correlated signal, the correlating with the synchronization sequence and the second synchronization sequence are implemented in a frequency domain;

convert the resulting correlated signal and the second resulting correlated signal to a time domain; and apply a differential product to corresponding multipath components of the resulting correlated signal and the second resulting correlated signal to obtain the frequency offset.

* * * * *